US007965841B2

(12) United States Patent
Itani

(10) Patent No.: US 7,965,841 B2
(45) Date of Patent: Jun. 21, 2011

(54) METHOD AND APPARATUS FOR COMPRESSING AND DECOMPRESSING DATA, AND COMPUTER PRODUCT

(75) Inventor: Noriko Itani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1139 days.

(21) Appl. No.: 11/287,508

(22) Filed: Nov. 28, 2005

(65) Prior Publication Data

US 2006/0170574 A1   Aug. 3, 2006

(30) Foreign Application Priority Data

Jan. 31, 2005   (JP) .................................. 2005-023825

(51) Int. Cl.
  *H04N 7/167*   (2011.01)
(52) U.S. Cl. ........................................ 380/217; 380/269
(58) Field of Classification Search .................. 380/217, 380/269
  See application file for complete search history.

(56) References Cited

U.S. PATENT DOCUMENTS

| 4,888,645 | A | * | 12/1989 | Mitchell et al. ............... 382/235 |
| 5,351,299 | A | * | 9/1994 | Matsuzaki et al. ............. 380/37 |
| 5,642,421 | A | * | 6/1997 | Gray et al. ..................... 713/160 |
| 6,173,384 | B1 | * | 1/2001 | Weaver .......................... 711/216 |
| 6,957,349 | B1 | | 10/2005 | Yasukura |
| 2004/0076299 | A1 | * | 4/2004 | Wang ............................. 380/269 |
| 2004/0080533 | A1 | * | 4/2004 | Nishtala et al. ............... 345/748 |
| 2004/0264698 | A1 | * | 12/2004 | Oda ............................... 380/269 |
| 2005/0169465 | A1 | | 8/2005 | Itani |

FOREIGN PATENT DOCUMENTS

| JP | 5-56267 | 3/1993 |
| JP | 5-254184 | 10/1993 |
| JP | 5-316466 | 11/1993 |
| JP | 5-344118 | 12/1993 |
| JP | 09-298559 A | 11/1997 |
| JP | 10-187593 A | 7/1998 |
| JP | 10-304206 | 11/1998 |
| JP | 11-134259 | 5/1999 |
| JP | 1999-134259 A | 5/1999 |
| JP | 11298740 | 10/1999 |
| JP | 2000-172548 A | 6/2000 |
| JP | 2000-173178 A | 6/2000 |
| JP | 2001-069010 A | 3/2001 |
| JP | 2003-16040 | 1/2003 |
| JP | 2003-143131 | 5/2003 |
| JP | 2003-296179 | 10/2003 |

(Continued)

OTHER PUBLICATIONS

Search/Examination Report in corresponding GB Patent Application No. 0524412.4 dated Mar. 23, 2006.

(Continued)

*Primary Examiner* — Jason K Gee
(74) *Attorney, Agent, or Firm* — Fujitsu Patent Center

(57) ABSTRACT

A bit string having a predetermined length is added to a head of a data string. The data string to which the bit string is added is compressed to produce a compressed data string. A head part is taken off from the compressed data string. The head part includes from a head position of the compressed data string to a predetermined position of the bit string compressed at the compressing. The head part and a latter part of the compressed data are output separately.

8 Claims, 17 Drawing Sheets

FOREIGN PATENT DOCUMENTS

| | | |
|---|---|---|
| JP | 2004-053968 A | 2/2004 |
| JP | 2004-053969 A | 2/2004 |
| JP | 2001-119588 | 4/2004 |
| JP | 2005-217842 | 8/2005 |
| WO | WO 00/45358 A1 | 8/2000 |

OTHER PUBLICATIONS

"Japanese Office Action" mailed Sep. 29, 2009 in corresponding JP Patent Application No. 2005-023825, Partial English Translation.

"Japanese Office Action" mailed by JPO and corresponding to Japanese Application No. 2005-023825 on Jul. 6, 2010, with partial English Translation.

Tarukawa, Hiromu et al., "A Secret-Key Cryptosystem Using Arithmetic Coding", Technical research report of Institute of Electronics, Information and Communication Engineers (IEICE), published by IEICE, Jul. 19, 1991, vol. 91, No. 161, pp. 17-20 with partial English Translation.

\* cited by examiner

FIG.16
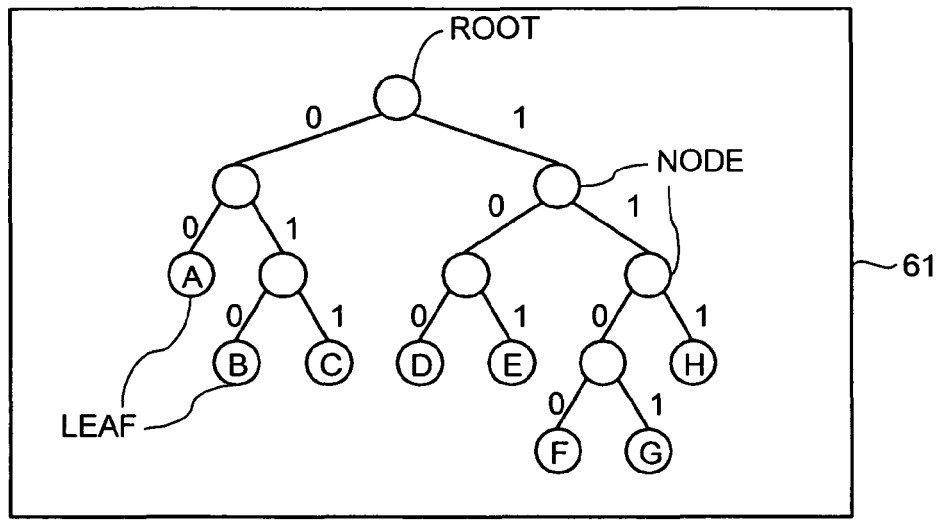
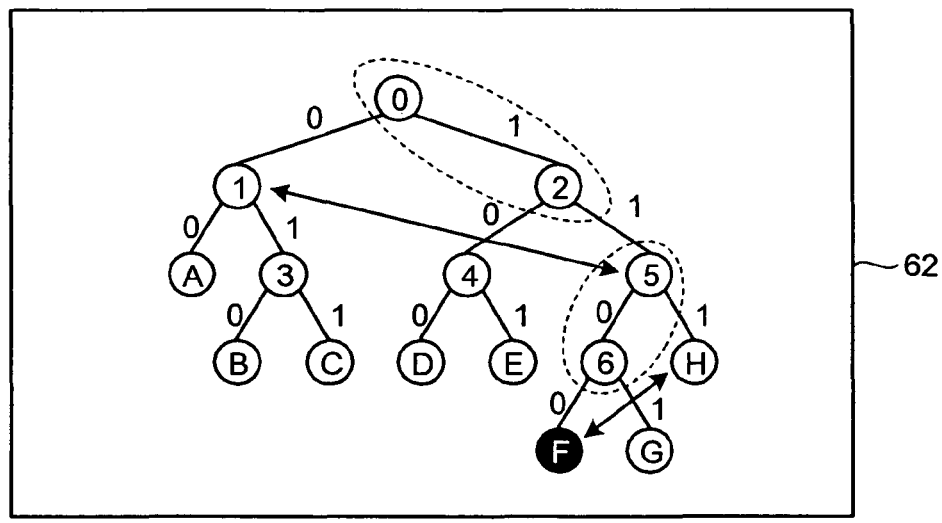
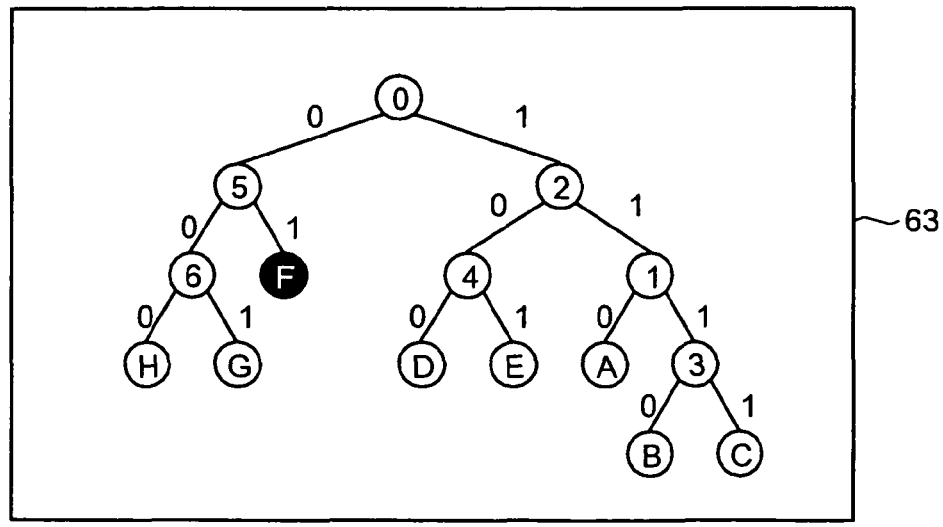

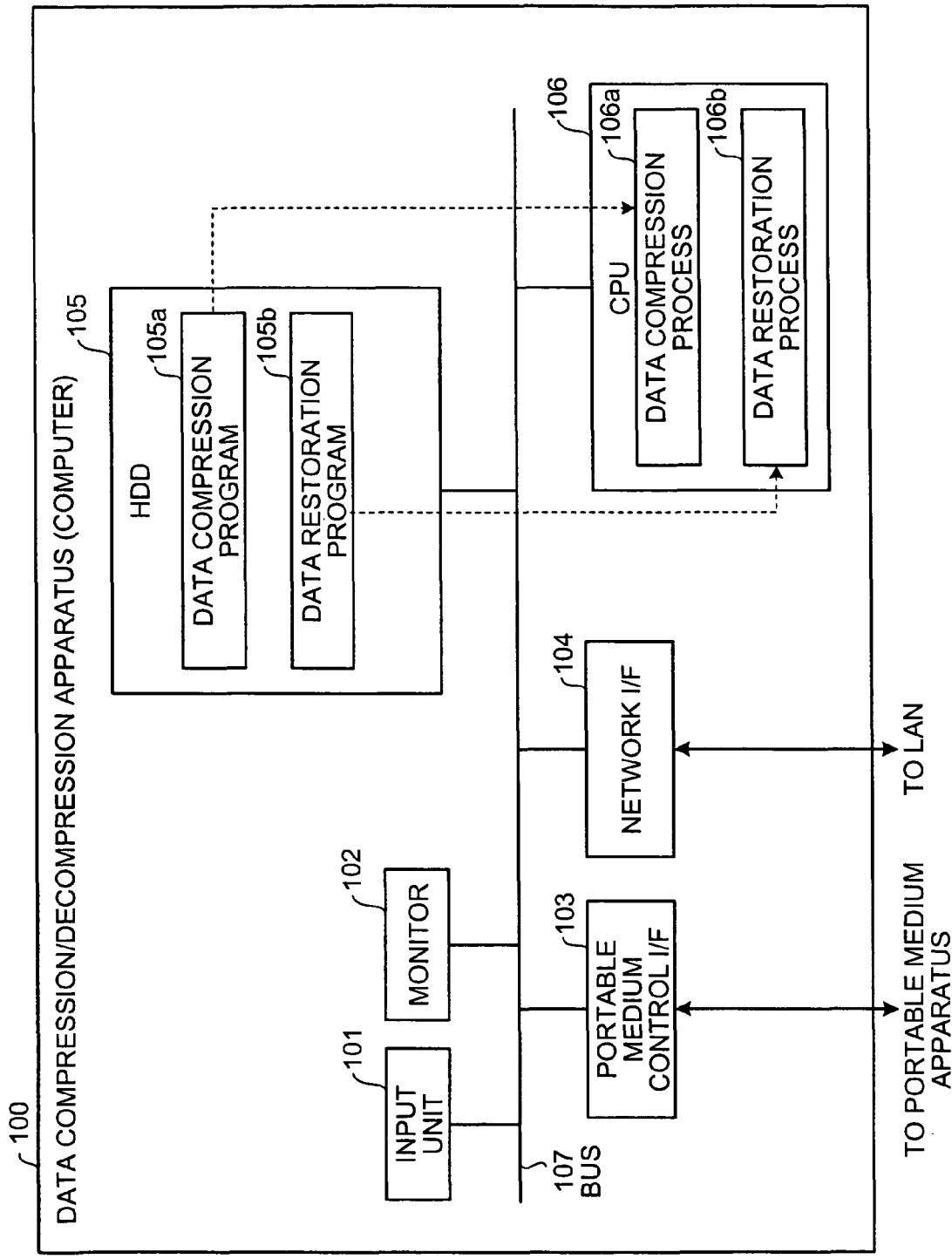

METHOD AND APPARATUS FOR COMPRESSING AND DECOMPRESSING DATA, AND COMPUTER PRODUCT

BACKGROUND OF THE INVENTION

1. Field of the Invention

The present invention relates to a technology for compressing and decompressing data with a reduction of data size and an increased security.

2. Description of the Related Art

Recently, with the spread of the Internet and mobile terminals, there are increasing concerns about data stored in respective devices, reduction of data size communicated between respective devices, and security (data secrecy). As the technique relating to the reduction of data size, various compression techniques have been disclosed, and by using such compression techniques, needs for reduction of data size can be satisfied.

As the technique relating to data secrecy, a method of adding a password function to the data and a method of encrypting data have been disclosed. By using these techniques and the compression technique together, both reduction of the data size and the data secrecy can be realized.

For example, there is a data compression method with a password function in which password information is attached to the compressed data, as the technique for realizing both reduction of the data size and the data secrecy. According to the data compression method with the password function, compressed data including the password information is created by adding a password to the compressed data. Only when a password newly input on the decompression side matches the password input on the compression side, decompression of the compressed data can be performed.

Japanese Patent Application Laid-open No. 2001-119588 discloses a technique relating to a fax machine in which by inserting a dummy data in the compressed image data, the secrecy of the image data is maintained, thereby realizing both reduction of the data size and data secrecy.

However, in the data compression method with the password function, the compressed data itself is not subjected to a process for concealing the data. Therefore, there is a problem in that the compressed data can be decompressed only by removing the password information from the compressed data including the password information. That is, in such a data compression method, the security level of the compressed data is low.

Also in the technique disclosed in Japanese Patent Application Laid-open No. 2001-119588, the compressed data itself (image data after compression) is not subjected to the process for concealing the data, and hence, there is the same problem such that only by removing the inserted dummy data, the compressed data can be decompresseded.

Therefore, it is very important how to realize a data compression method and an decompression method that can realize both reduction of data size and the data secrecy by giving the secrecy to the compressed data itself.

SUMMARY OF THE INVENTION

It is an object of the present invention to at least solve the problems in the conventional technology.

A method according to one aspect of the present invention, which is for creating a compressed data string having secrecy from a data string to be compressed, includes adding a bit string having a predetermined length to a head of the data string; compressing the data string to which the bit string is added to produce the compressed data string; and taking off a head part from the compressed data string. The head part includes from a head position of the compressed data string to a predetermined position of the bit string compressed at the compressing.

A method according, to another aspect of the present invention, which is for decompressing a data string from data output by adding a bit string having a predetermined length to a head of the data string, compressing the data string to which the bit string is added to produce a compressed data string, taking off a head part from the compressed data string, and outputting the head part and a first block obtained by dividing a latter part of the compressed data into at least one block separately, includes reproducing the compressed data string from the head part and the at least one block; decoding the compressed data string reproduced at the reproducing; and outputting the data string by removing the bit string from the decoded data string.

A method according to still another aspect of the present invention, which is for decompressing a data string by using data output by adding a bit string having a predetermined length to a head of the data string, compressing the data string to which the bit string is added to produce a compressed data string, taking off a head part from the compressed data string, and outputting a latter part of the compressed data string obtained by removing the head part from the compressed data string, includes compressing the bit string; taking off the head part from the compressed bit-string; inputting the latter part; reproducing the compressed data string by adding the head part to a head of the latter part; decoding the reproduced compressed-data-string; and outputting the data string by removing the bit string from the decoded data string.

A method according to still another aspect of the present invention, which is for decompressing a data string by using data output by adding a bit string having a predetermined length to a head of the data string, compressing the data string to which the bit string is added to produce a compressed data string, taking off a head part from the compressed data string, creating a key, creating an optional seed, creating the bit string from the key and the seed by using a hash function, adding the seed to a latter part of the compressed data string obtained by removing the head part from the compressed data string, and outputting the latter part to which the seed is added, includes creating a key; separating the seed from the latter part; creating the bit string from the key and the seed separated from the latter part, by using the hash function; compressing the created bit-string; taking off the head part from the compressed bit-string; inputting the latter part from which the seed is separated; reproducing the compressed data string by adding the head part to a head of the latter part; decoding the reproduced compressed-data-string; and outputting the data string by removing the bit string from the decoded data string.

A method according to still another aspect of the present invention, which is for decompressing a data string by using data output by adding a bit string having a predetermined length to a head of the data string, compressing the data string to which the bit string is added to produce a compressed data string, taking off a head part from the compressed data string, creating a key, creating different counter values based on a predetermined rule, creating the bit string from the key and the counter value by using a hash function, and outputting the head part and a first block obtained by dividing a latter part of the compressed data into at least one block separately, includes creating a key; creating different counter values based on a predetermined rule, every time the counter value is created; creating the bit string from the key and the counter value created at the counter value by using the hash function; compressing the created bit-string; taking off the head part from the compressed bit-string; inputting the latter part; reproducing the compressed data string by adding the taken-off head-portion to a head of the latter part; decoding the reproduced compressed-data-string; and outputting the data string by removing the bit string from the decoded data string.

A method according to still another aspect of the present invention, which is for decompressing a data string by using data output by adding a bit string having a predetermined length to a head of the data string, compressing the data string to which the bit string is added to produce a compressed data string, taking off a head part from the compressed data string, storing a bit string group, selecting a bit string from the stored bit-string-group, adding information on the selected bit-string to a latter part of the compressed data string obtained by removing the head part from the compressed data string, and outputting the latter part to which the information on the selected bit-string is added, includes storing a bit string group; separating the information on the selected bit-string from the latter part; selecting a bit string from the stored bit-string-group by using the separated information; compressing the selected bit string; taking off the head part from the compressed bit-string; inputting the latter part from which the information is separated; reproducing the compressed data string by adding the head part to a head of the latter part; decoding the reproduced compressed-data-string; and outputting the data string by removing the bit string from the decoded data string.

An apparatus according to still another aspect of the present invention, which is for creating a compressed data string having secrecy from a data string to be compressed, includes an adding unit configured to add a bit string having a predetermined length to a head of the data string; a compressing unit configured to compress the data string to which the bit string is added to produce the compressed data string; and a taking off unit configured to take off a head part from the compressed data string, the head part including from a head position of the compressed data string to a predetermined position of the bit string compressed at the compressing.

A computer-readable recording medium according to still another aspect of the present invention stores a computer program for creating a compressed data string having secrecy from a data string to be compressed. The computer program causes a computer to execute adding a bit string having a predetermined length to a head of the data string; compressing the data string to which the bit string is added to produce the compressed data string; and taking off a head part from the compressed data string, the head part including from a head position of the compressed data string to a predetermined position of the bit string compressed at the compressing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a schematic for illustrating an outline of Splay tree coding; and

FIG. 17 is a schematic of a computer that executes a data compression program and a data decompression program.

DETAILED DESCRIPTION OF THE PREFERRED EMBODIMENTS

Exemplary embodiments of the present invention are explained below in detail with reference to the accompanying drawings. It should be noted that the invention is not limited by the embodiments.

Figure 1:
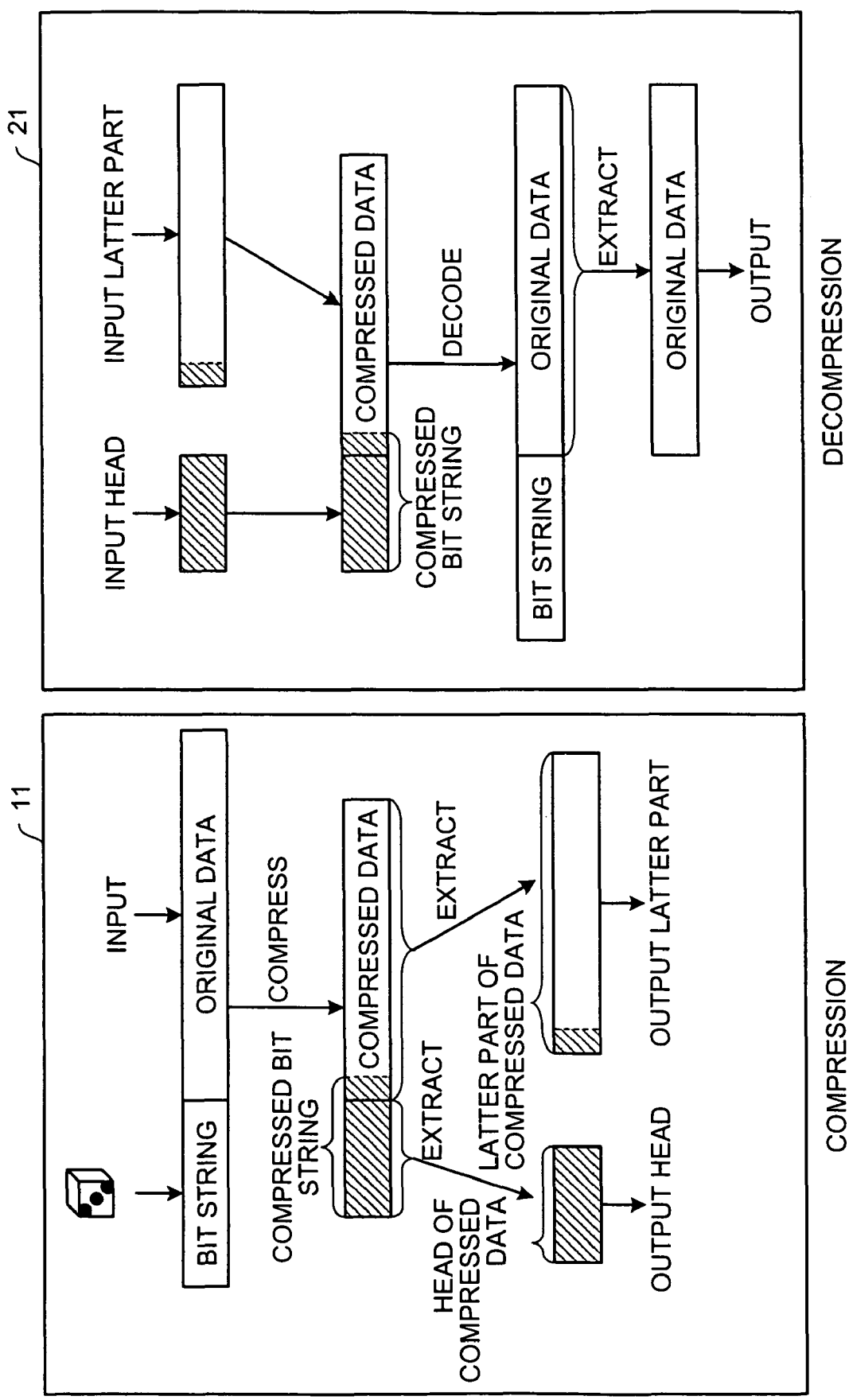
FIG. 1 is a schematic for illustrating an outline of a data compression method and a data decompression method according to a first embodiment of the present invention.

FIG. 1 is a schematic for illustrating an outline of a data compression method and a data decompression method according to a first embodiment of the present invention.

In the data compression method, a bit string generated by a random number generating function is added to the head of original data to be compressed, and the original data added with the bit string is compressed by using a predetermined compression method. The compressed data is separated into a head part and a latter part excluding the head part, and output to a different output destination.

The first embodiment is characterized in that a compression method by Splay tree coding is used as the compression method, and by contriving the separation position of the compressed data, data secrecy is provided to the separated head part and the latter part.

Figure 15:
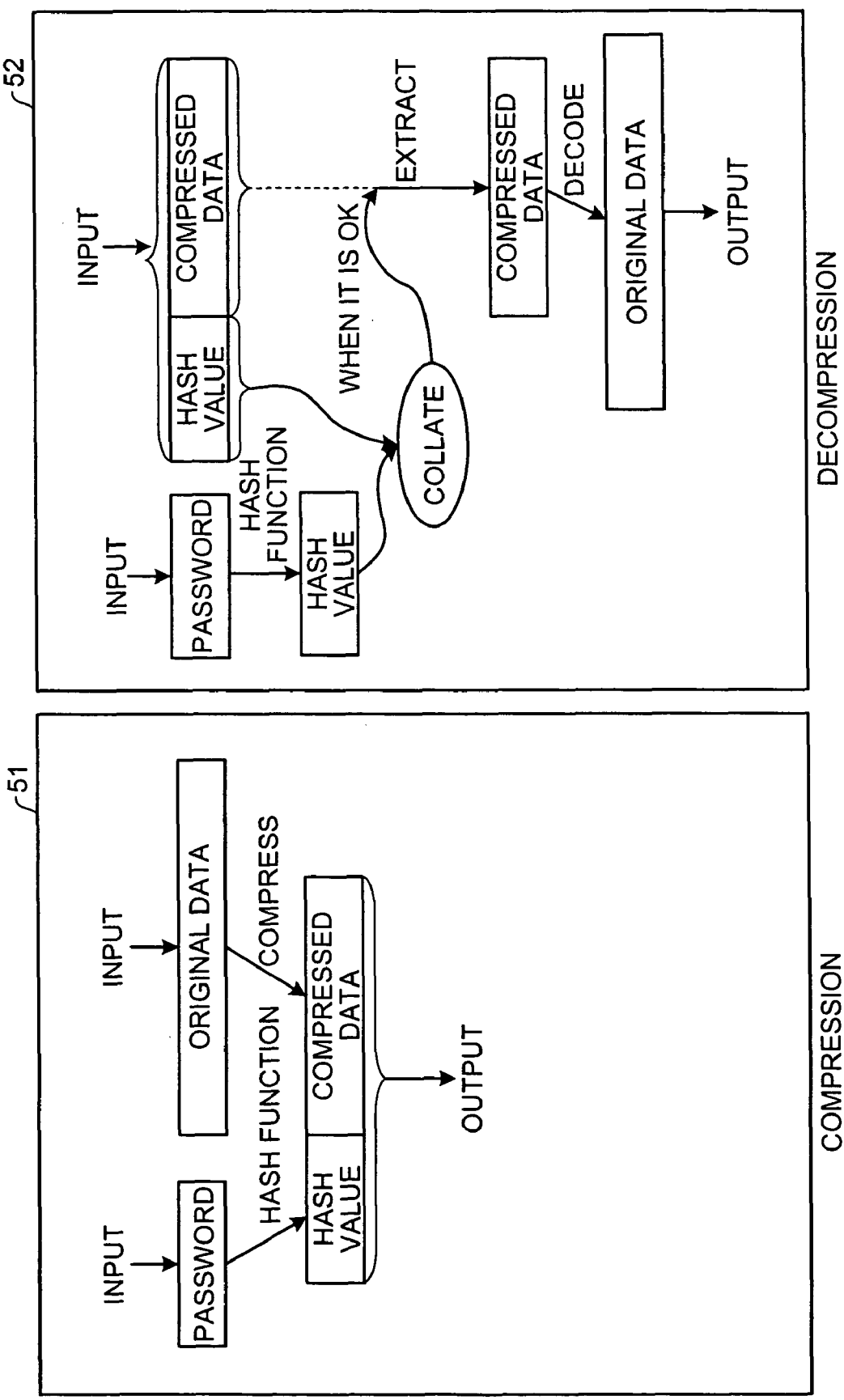
FIG. 15 is a schematic for illustrating an outline of a data compression method and a data decompression method according to a conventional technology.

In the conventional data compression method with a password function and data decompression method (FIG. 15), the original data is compressed to create compressed data, and a password converted to a hash value by a hash function is added to the head part of the created compressed data.

On the decompression side, a password newly input on the decompression side is converted to a hash value by a hash function as on the compression side, and the hash value is collated with the hash value sent together with the compressed data, and only when these hash values match each other, an decompression process is performed.

However, with this data compression method with a password function, since the compressed data itself is not subjected to the process for concealing the data, there is a problem in that the compressed data can be decompressed only by removing the hash value added to the compressed data. According to the data compression method and the data decompression method of the present invention, the compressed data itself is subjected to the process for concealing the data, thereby solving the above problem.

FIG. 16 is a schematic for illustrating an outline of the Splay tree coding. The Splay tree coding employs binary trees, and by collapsing the tree so that the code length of the appeared character becomes half, the code length of the character is changed according to the frequency of occurrences of the character at any time.

Reference numeral 61 in FIG. 16 denotes a coding tree consisting of 8 characters of A to H. "o" at the top of the tree is referred to as a "root", and other "o" are referred to as a "node". "o" in which characters of A to H are written is referred to as a "leaf".

Lines connecting the "root", "node", and "leaf" are referred to as a "path", and numerals "0" and "1" written in each path are referred to as a "code". For example, the code representing character "A" is "00", and the code representing character "F" is "1100".

In the coding tree 61, the procedure of collapsing the coding tree when character "F" is newly read to perform a compression process is explained, with reference to 62 and 63 in FIG. 16. As shown in the coding tree 62, while the newly read character "F" is traced from the "leaf" to the "root", two pairs of "nodes" are created. In each pair, children in the pair of "nodes" ("node" or "leaf") are exchanged so as to reduce the path from "F" to the "root" by one.

In the coding tree 62, "F", which is a child of "node 6", is exchanged with "H", which is a child of "node 5", and subsequently, a tree which is a subordinate of "node 5", which is a child of "node 2", is exchanged with a tree which is a subordinate of "node 1", which is another child of the "root" ("node 0").

The coding tree collapsed in this manner is shown in 63 of FIG. 16. The code of character "F" before collapsing shown in the coding tree 62 is "1100". However, the code of character "F" after collapsing shown in the coding tree 63 becomes "01". Thus, the coding length is reduced from 4 bits to 2 bits.

Since such a collapsing process affects the entire tree, a binary tree having a structure quite different from the former binary tree is created, every time the data to be compressed is reflected on the tree. Accordingly, when data compression is performed according to the compressed data method of the Splay tree coding, the compressed data cannot be decompressed from the middle of the compressed data.

In other words, to restore the compressed data, it is necessary to perform an decompression process from the head of the compressed data. Therefore, when the data compressed by the Splay tree coding is divided into two at an optional position, the information of the original data cannot be obtained from the compressed data in the latter part.

In the data compression method according to the first embodiment, the compressed data created in the above procedure is divided into a "head part of the compressed data" and a "latter part of the compressed data". When the compressed data is separated, separation is carried out at a position of dividing the compressed bit string. The thus separated "head part of the compressed data" and "latter part of the compressed data" are output to output destinations different from each other.

Since the "head part of the compressed data" corresponds to the data near the head position of the compressed data by the Splay tree coding, the "head part of the compressed data" can be decoded by a malicious third party. However, the "head part of the compressed data" includes only a part of a bit string created by the random number generating function, which does not have any meaning. Therefore, even if the "head part of the compressed data" is decoded, the information relating to the original data cannot be obtained from the "head part of the compressed data".

Since the compressed data created by the compression method using the Splay tree coding cannot be decompressed from the middle of the compressed data, the "latter part of the compressed data" cannot be decoded. Accordingly, even if the "latter part of the compressed data" is obtained by a malicious third party, the "latter part of the compressed data" cannot be decoded.

In this manner, the information amount that can be obtained from the "head part of the compressed data" is zero, and the information amount that can be obtained from the "latter part of the compressed data" is also zero. Therefore, even if one of these partial data is obtained by the malicious third party, the secrecy of the original data can be ensured.

When the compressed data is decompressed, the head part and the latter part obtained by separate routes are input, and the head part is added to the head of the latter part, thereby reproducing the compressed data. The reproduced compressed data is decoded by the Splay tree coding used in a compression process, and the original data is extracted and output from the decoded compressed data, thereby restoring the original data.

Thus, in the data compression method and the data decompression method according to the first embodiment, on the compression process side, an optional bit string is added to the original data and the compression process is performed, to separate the data into the head part and the latter part, and these data are sent to the decompression process side through different routes. On the decompression process side, the compressed data is reproduced from the head part and the latter part sent via the different routes, and a decoding process is carried out to restore the original data. Since the information of the original data cannot be obtained only from the separated head part or the latter part, it means that the compressed data itself has the secrecy.

Consequently, according to the data compression method and the data decompression method in the first embodiment, both reduction of the data size and data secrecy can be realized by giving the secrecy to the compressed data itself to increase the security level.

Figure 2:
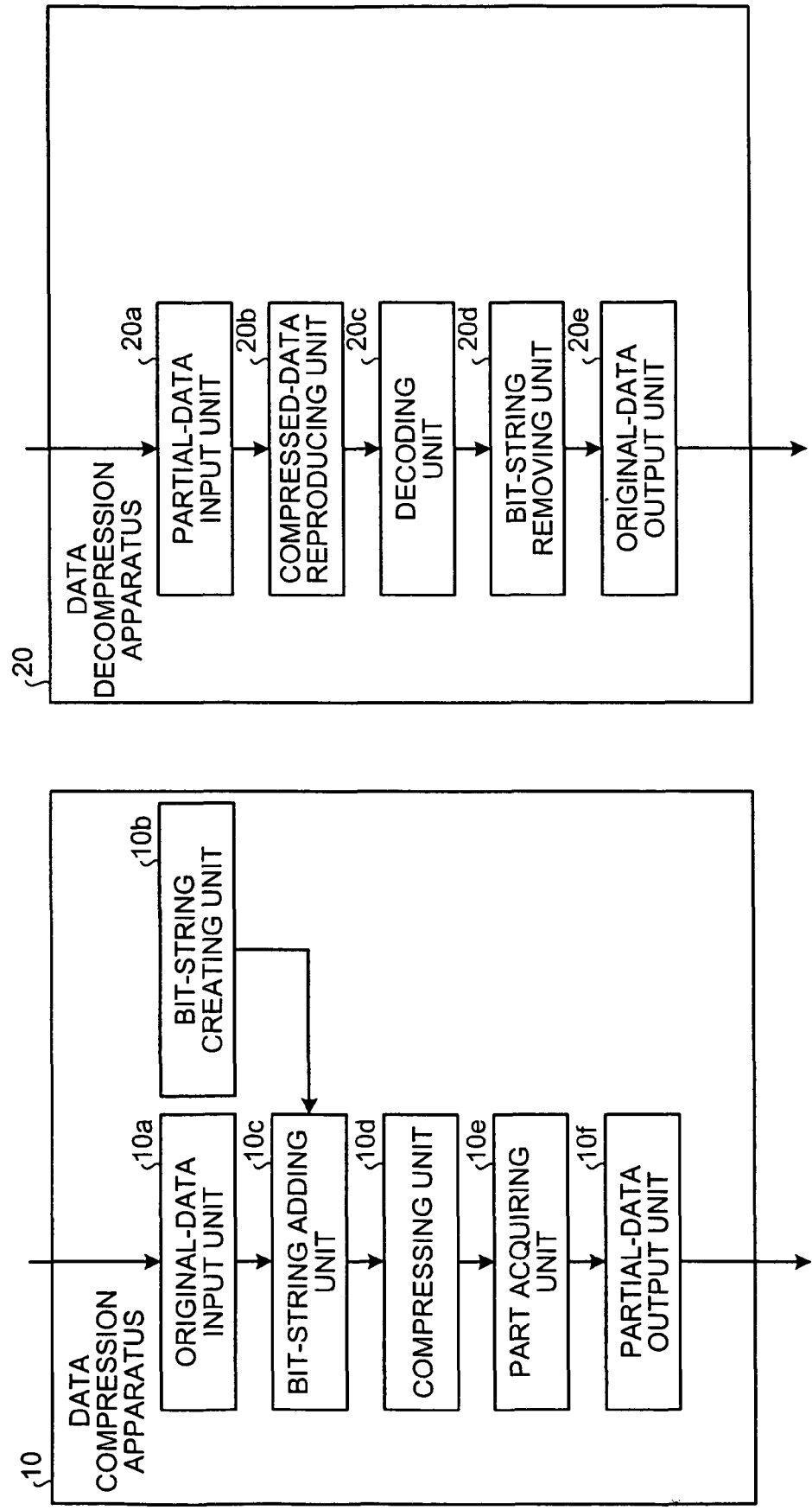
FIG. 2 is a functional block diagram of a configuration of a data compression apparatus and a data decompression apparatus according to the first embodiment.

FIG. 2 is a functional block diagram of a configuration of a data compression apparatus 10 and a data decompression apparatus 20 according to the first embodiment.

The data compression apparatus 10 includes an original-data input unit 10a, a bit-string creating unit 10b, a bit-string adding unit 10c, a compressing unit 10d, a part acquiring unit 10e, and a partial-data output unit 10f.

The original-data input unit 10a inputs data to be compressed (original data). Upon reception of the data to be compressed (original data), the original-data input unit 10a sends the received data to be compressed to the bit-string adding unit 10c. There is no limitation on the type and the size of the data to be compressed (original data).

The bit-string creating unit 10b creates an optional bit string by the random number generating function or the like, and sends the created bit string to the bit-string adding unit 10c. The bit string created by the bit-string creating unit 10b does not have a meaning. The bit length of the created bit string is common to the bit length used in a bit-string removing unit 20d in a data decompression apparatus 20 described later.

The bit-string adding unit 10c adds the bit string received from the bit-string creating unit 10b to the head of the original data received from the original-data input unit 10a, and sends the original data added with the bit string to the compressing unit 10d.

The compressing unit 10d compresses the original data added with the bit string, which has been received from the bit-string adding unit 10c, by the compression method using the Splay tree coding, and sends the compressed data to the part acquiring unit 10e.

The part acquiring unit 10e separates the compressed data received from the compressing unit 10d into the head part and the latter part, and sends the respective separated data strings to the partial-data output unit 10f. Specifically, at the time of separating the head part, the part acquiring unit 10e separates the head part, so that the optional bit string created by the bit-string creating unit 10b has a bit length equal to or shorter than the bit length of the data compressed by the compressing unit 10d.

By performing such a separation process, the head part does not include the original data at all, and the head part includes only a part of the bit string having no meaning, which is created by the random number generating function or the like. Accordingly, even if the head part is obtained by a malicious third party, leak of the information of the original data can be prevented.

The partial-data output unit 10f outputs the head part and the latter part sent from the part acquiring unit 10e to output destinations respectively different from each other. For example, the partial-data output unit 10f transmits the head part to the decompression side via a communication network, and outputs the latter part to a portable recording medium such as a compact disk-Recordable (CD-R). Accordingly, the compressed data can be sent safely to the decompression side.

To send the compressed data safely to the decompression side, it is only necessary that any of the head part and the latter part is not obtained by a malicious third party. Therefore, the head part can be transmitted to a server device via the communication network, and the latter part can be transmitted to a computer on the decompression side. Furthermore, a first half can be transmitted to a first server device via the communication network, and a second half can be transmitted to a second server device via the communication network. Alternatively, the output destinations of the first half and the second half can be exchanged, or combined.

The head part can be output to a universal serial bus (USB) memory, and the latter part can be stored in a hard disk drive (HDD). Accordingly, the data on a computer can be managed safely.

To manage the data on the computer safely, it is only necessary that any of the head part and the latter part is not obtained by a malicious third party. Therefore, the head part can be transmitted to a server device via the communication network, or can be output to a portable recording medium such as the CD-R.

The data decompression apparatus 20 includes a partial-data input unit 20a, a compressed-data reproducing unit 20b, a decoding unit 20c, the bit-string removing unit 20d, and an original-data output unit 20e.

The partial-data input unit 20a inputs the head part and the latter part separated and output by the data compression apparatus 10. Upon reception of the head part and the latter part, the partial-data input unit 20a sends these data strings to the compressed-data reproducing unit 20b.

The compressed-data reproducing unit 20b reproduces the compressed data from the head part and the latter part received from the partial-data input unit 20a, and sends the compressed data to the decoding unit 20c. Specifically, the compressed-data reproducing unit 20b adds the head part to the head of the latter part, to reproduce the compressed data.

The decoding unit 20c decodes the compressed data received from the compressed-data reproducing unit 20b, by a decoding method corresponding to the compression method using the Splay tree coding used in the compression process by the data compression apparatus 10, and sends the decoded data to the bit-string removing unit 20d.

The bit-string removing unit 20d removes the bit string added to the head from the decoded data received from the decoding unit 20c to extract the original data, and sends the extracted original data to the original-data output unit 20e. The bit length used by the bit-string removing unit 20d at the time of removing the bit string is common to that of the bit string created by the bit-string creating unit 10b.

The original-data output unit 20e outputs the original data received from the bit-string removing unit 20d to an output device such as an HDD, or a random access memory (RAM).

Figure 3:
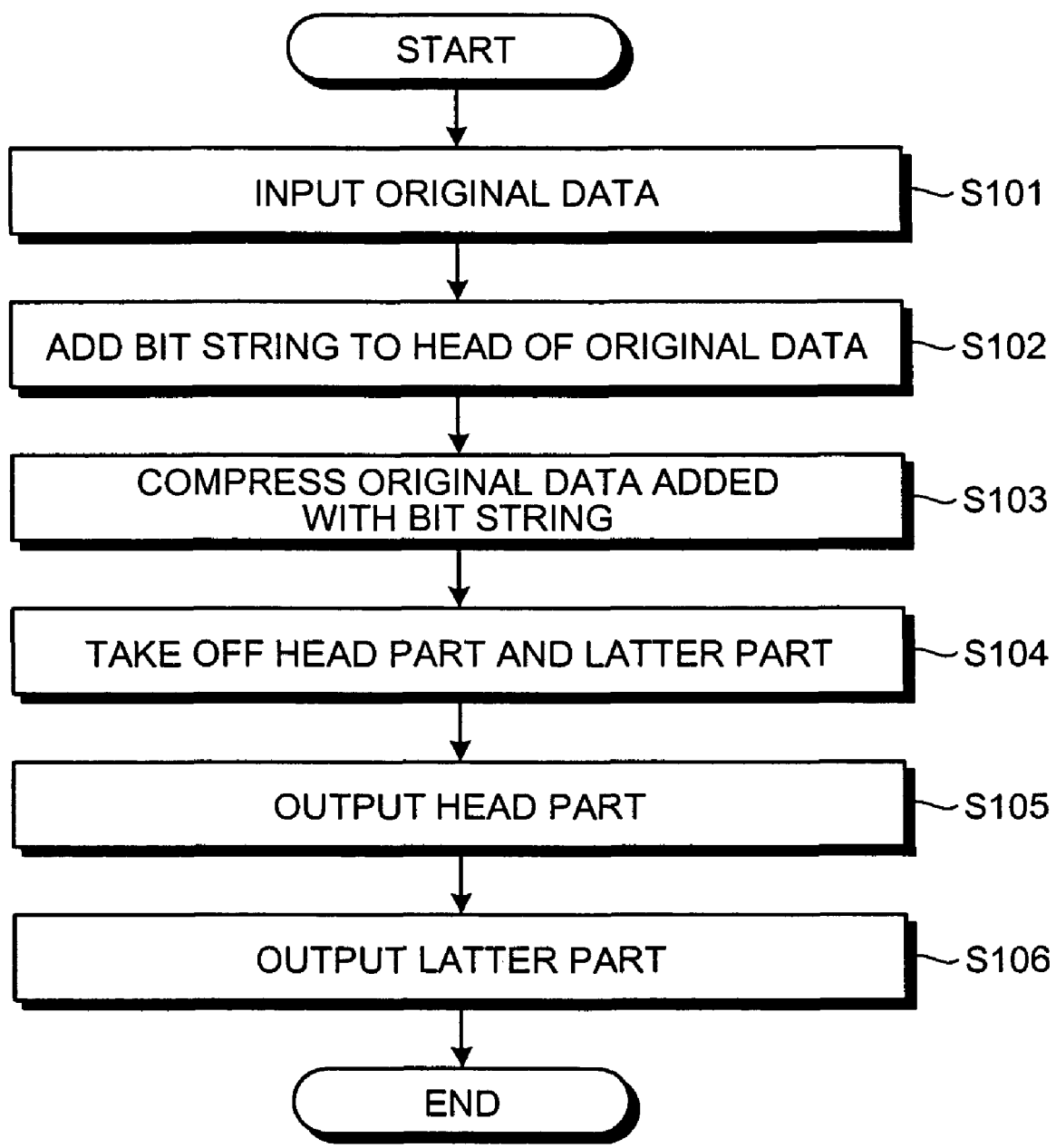
FIG. 3 is a flowchart of a processing procedure for a data compression according to the first embodiment.

FIG. 3 is a flowchart of a processing procedure for the data compression according to the first embodiment. When the original data is input to the original-data input unit 10a in the data compression apparatus 10 (step S101), the bit-string adding unit 10c adds the bit string created by the bit-string creating unit 10b to the head of the original data (step S102).

The compressing unit 10d compresses the original data added with the bit string (step S103), and sends the compressed data to the part acquiring unit 10e. The part acquiring unit 10e separates the compressed data at a predetermined position, and takes off the head part and the latter part (step S104)

The partial-data output unit 10f having received the head part and the latter part outputs the head part (step S105) and outputs the latter part (step S106), to finish the process.

Figure 4:
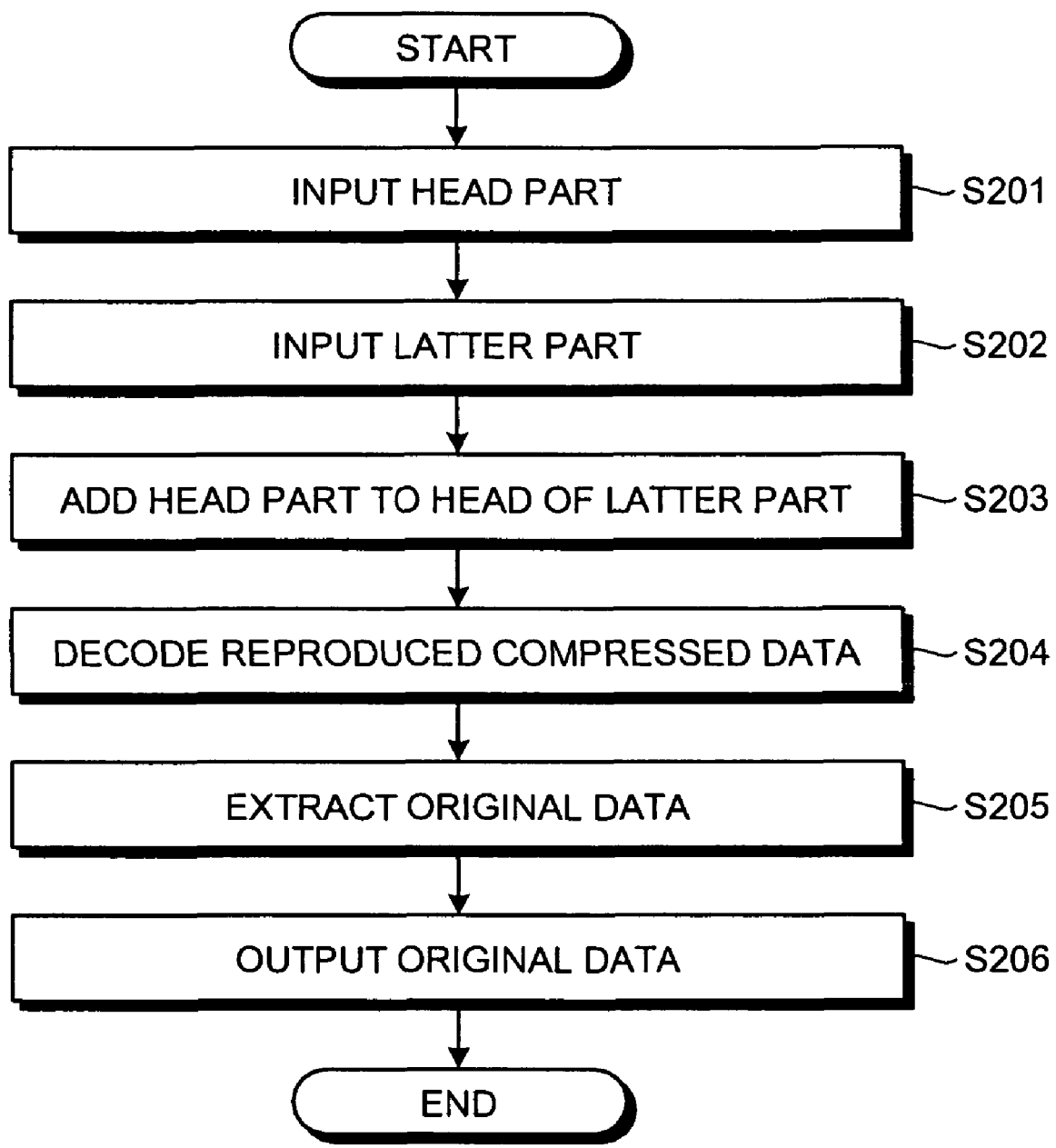
FIG. 4 is a flowchart of a processing procedure for a data decompression according to the first embodiment.

FIG. 4 is a flowchart of a processing procedure for the data decompression according to the first embodiment. The partial-data input unit 20a in the data decompression apparatus 20 inputs the head part output from the data compression apparatus 10 (step S201), and then inputs the latter part (step S202).

The compressed-data reproducing unit 20b adds the head part input by the partial-data input unit 20a to the head of the latter part input likewise (step S203), to reproduce the compressed data. Subsequently, the decoding unit 20c decodes the compressed data reproduced by the compressed-data reproducing unit 20b (step S204), and the bit-string removing unit 20d extracts the original data from the data reproduced by the decoding unit 20c (step S205).

Subsequently, the original-data output unit 20e outputs the original data extracted by the bit-string removing unit 20d to an HDD or an RAM (step S206), to finish the process.

According to the first embodiment, since the compressed data itself has the secrecy, both reduction of the data size and data secrecy can be realized.

Furthermore, according to the first embodiment, on the compression side, the original data added with the bit string data is compressed, and the compressed data is separated into two data strings of the head part and the latter part, and output. However, in the data compression method and the data decompression method according to the present invention, the latter part can be further separated and output.

Figure 5:
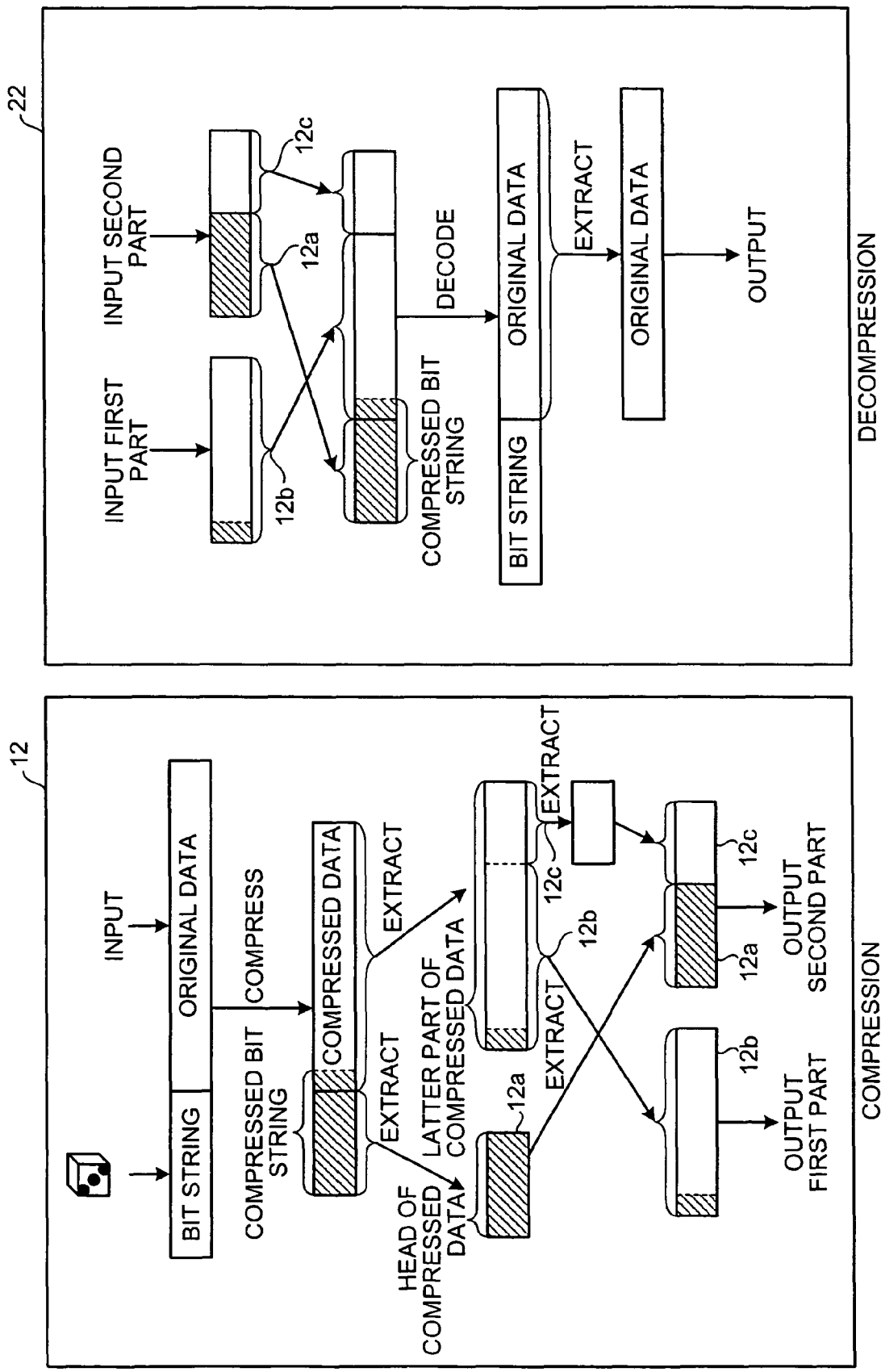
FIG. 5 is a schematic for illustrating an outline of a data compression method and a data decompression-method according to a second embodiment of the present invention.

FIG. 5 is a schematic for illustrating an outline of a data compression method and a data decompression method according to a second embodiment of the present invention.

A bit string generated by the random number generating function or the like is added to the head of original data to be compressed, and the original data added with the bit string is compressed by the compression method using the Splay tree coding, as in the first embodiment.

The created compressed data is separated into a head part 12a and the latter part, as in the first embodiment. In the data compression method according to the second embodiment, however, the latter part is further separated into 12b and 12c and taken off.

Among the compressed data (12a, 12b, and 12c) separated into three, 12b is output as a first half, and a data string added with 12a at the head of 12c is output as a second half.

The information amount that can be obtained from the thus output "first half of the compressed data" is zero. It is because the compressed data by the Splay tree coding cannot be decompressed from the middle. Furthermore, the information amount that can be obtained from the "second half of the compressed data" is zero. It is because 12a added to the head of the second half includes only a part of the bit string having no meaning, and 12c is a data string from the middle part of the compressed data. Therefore, even if one of these partial data (the first half and the second half of the compressed data) is obtained by a malicious third party, the secrecy of the original data can be ensured.

According to the second embodiment, a case that the second half obtained by removing the head part 12a from the compressed data is divided into two data strings, 12b and 12c has been explained. However, the second half can be divided into three or more data strings. In this case, the data string located immediately after the head part 12a and the head part 12a are output separately.

For example, when the second half obtained by removing the head part 12a from the compressed data is divided into three, that is, 12b, 12c, and 12d, a data string combining 12a and 12c, and 12b and 12d can be respectively output, or a data string combining 12a and 12d, and 12b and 12c can be respectively output.

According to the first embodiment, since the compressed data is separated into the head part and the latter part, the size of the head part is limited by the bit length of the bit string added to the head of the original data, and the usage of the head part is limited as a key.

According to the second embodiment, however, since the head part 12a whose length is limited is output by being combined with 12c, the divided size can be freely set, such that the length of the first half (12b) and the second half (12a and 12c) is made equal or the like. Accordingly, a wider usage than in the first embodiment is possible, for example, the first half and the second half are transmitted to different server devices.

When the compressed data is decompressed, the first half (12b) and the second half (12a and 12c) obtained from different routes are input, and the second half is divided into 12a and 12c. The compressed data is then reproduced by rearranging the data strings in the order of 12a, 12b, and 12c. The reproduced compressed data is decoded by the Splay tree coding used in the compression process, and the original data is extracted from the decoded compressed data and output, thereby restoring the original data.

Figure 6:
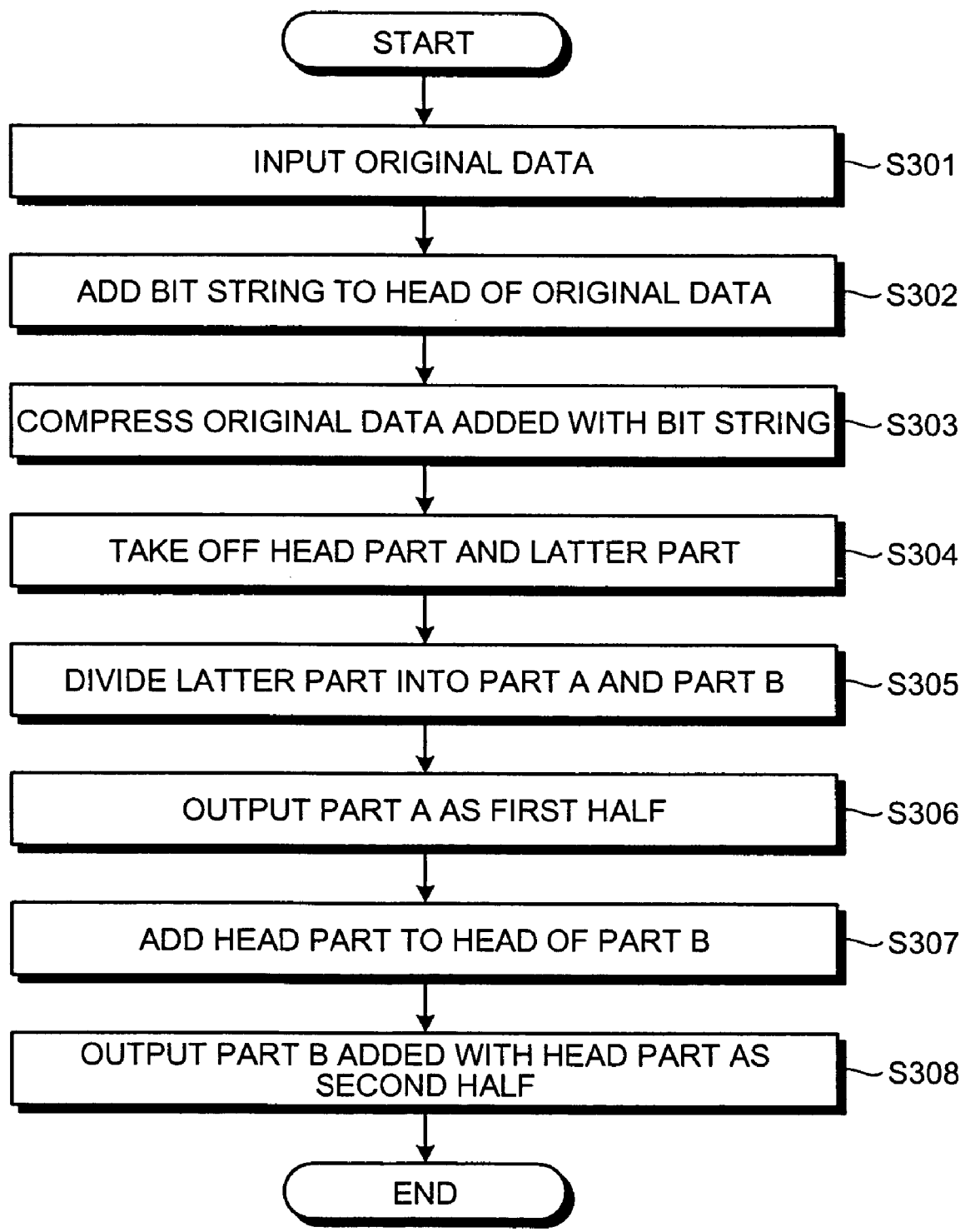
FIG. 6 is a flowchart of a processing procedure for a data compression according to the second embodiment.

FIG. 6 is a flowchart of a processing procedure for the data compression according to the second embodiment. When the original data is input by the original-data input unit 10a in the data compression apparatus 10 (step S301), the bit-string adding unit 10c adds the bit string created by the bit-string creating unit 10b to the head of the original data (step S302).

The compressing unit 10d compresses the original data added with the bit string (step S303), and sends the compressed data to the part acquiring unit 10e. The part acquiring unit 10e separates the compressed data at a predetermined position, to take off the head part and the latter part (step S304), divides the latter part into part A and part B (step S305), and sends the head part, part A, and part B to the partial-data output unit 10f.

The partial-data output unit 10f having received the head part, part A, and part B outputs the part A as a first half (step S306), adds the head part to the head of the part B (step S307), and outputs the part B added with the head part as a second half (step S308), to finish the process.

Figure 7:
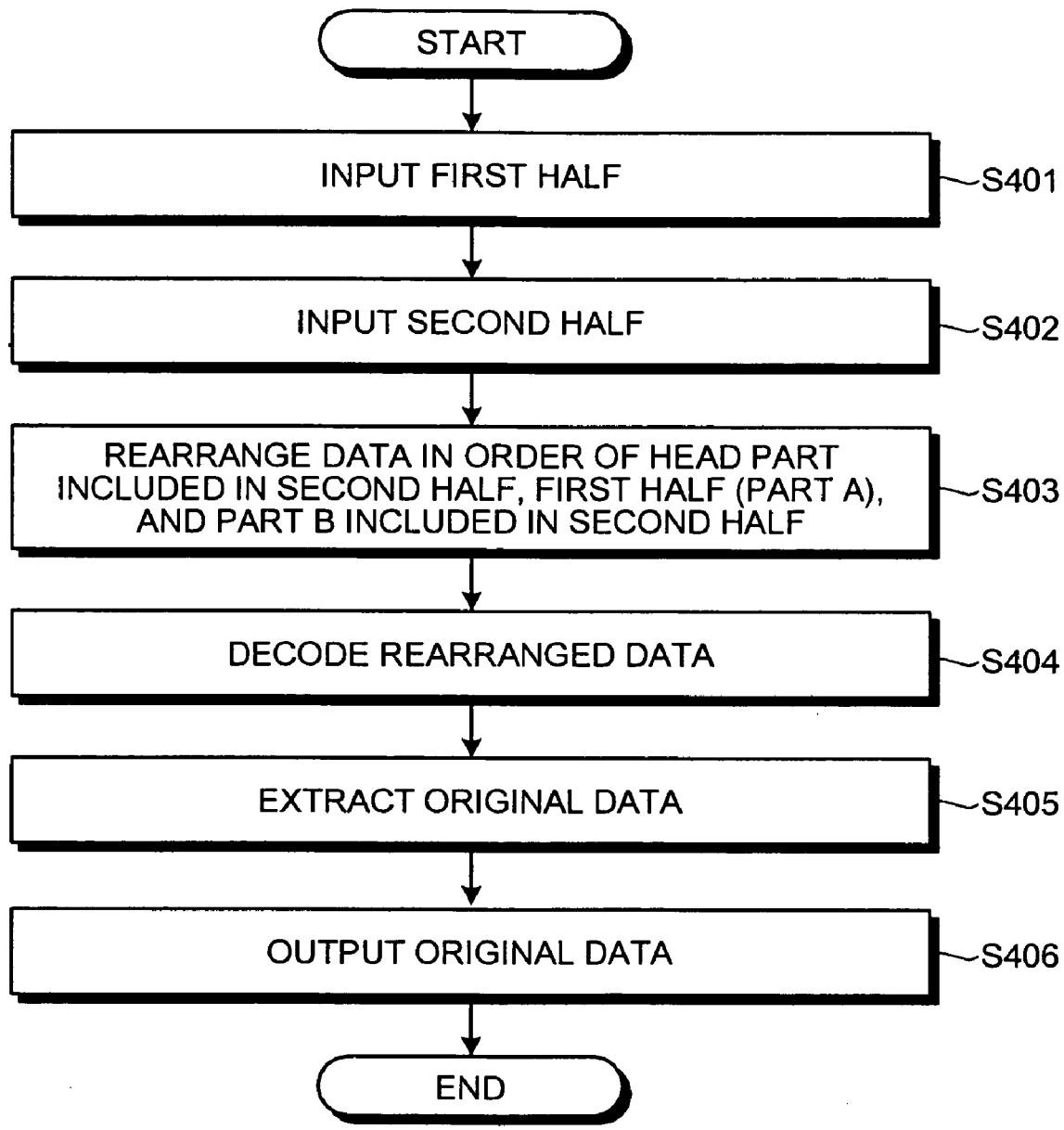
FIG. 7 is a flowchart of a processing procedure for a data decompression according to the second embodiment.

FIG. 7 is a flowchart of a processing procedure for the data decompression according to the second embodiment. The partial-data input unit 20a in the data decompression apparatus 20 inputs the first half output from the data compression apparatus 10 (step S401), and then inputs the second half (step S402).

The compressed-data reproducing unit 20b rearranges the data input by the partial-data input unit 20a in the order of the head part included in the second half, the first half (part A), and part B included in the second half, to reproduce the compressed data (step S403).

Subsequently, the decoding unit 20c decodes the compressed data reproduced by the compressed-data reproducing unit 20b (step S404), and the bit-string removing unit 20d extracts the original data from the data reproduced by the decoding unit 20c (step S405). The original-data output unit 20e outputs the original data extracted by the bit-string removing unit 20d to an HDD or an RAM (step S406), to finish the process.

According to the second embodiment, since the divided size can be freely set, a wide usage is possible, for example, the first half and the second half are transmitted to different server devices.

According to the first and the second embodiments, a case that the bit string added to the original data is sent from the compression side to the decompression side has been explained. However, such a bit string may not be sent from the compression side to the decompression side, and the same bit string as that generated on the compression side can be generated on the decompression side.

Figure 8:
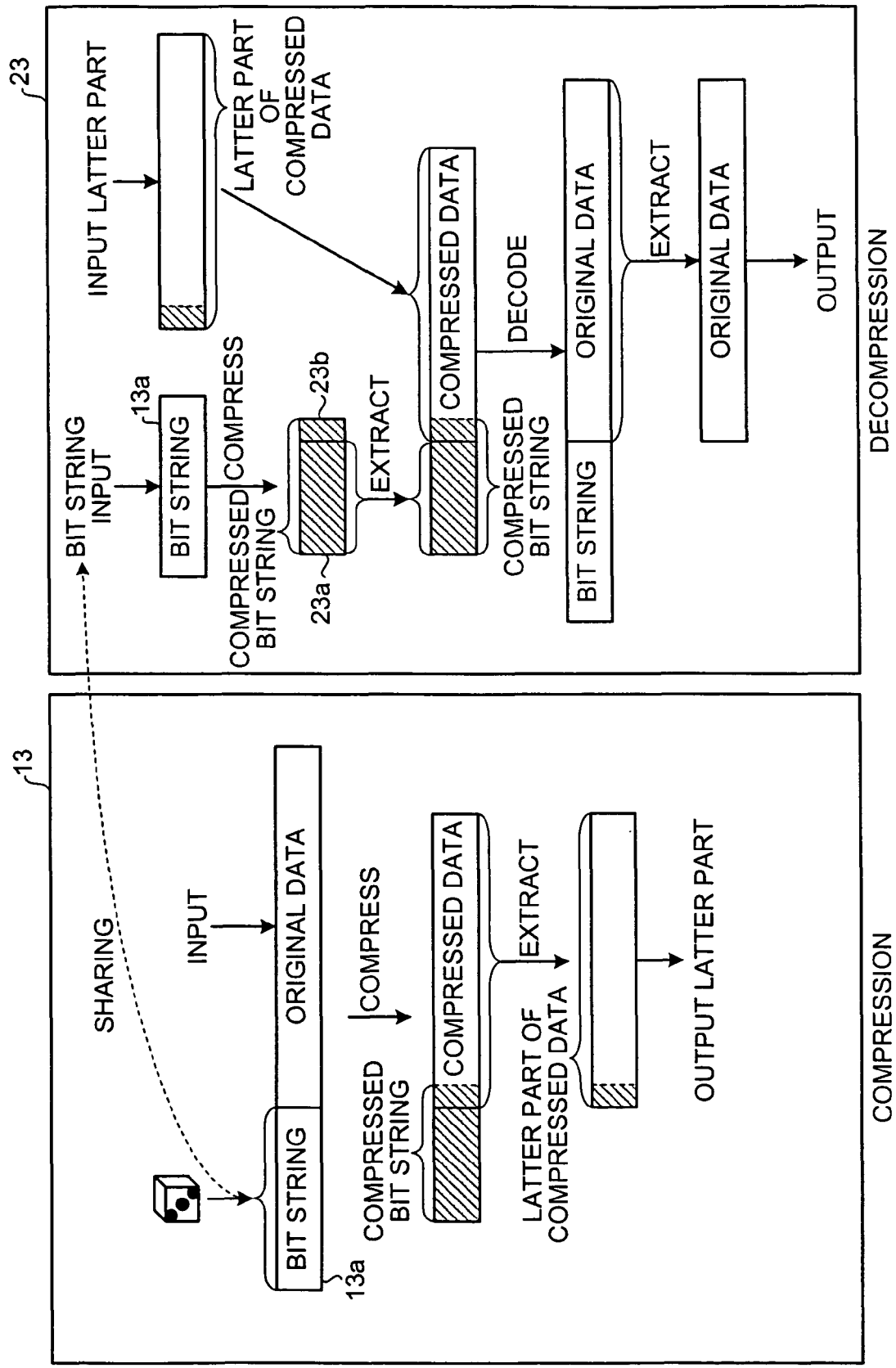
FIG. 8 is a schematic for illustrating an outline of a data compression method and a data decompression method according to a third embodiment of the present invention.

FIG. 8 is a schematic for illustrating an outline of a data compression method and a data decompression method according to a third embodiment of the present invention.

In this data compression method, a bit string 13a generated by the random number generating function or the like is added to the head of original data to be compressed, and the original data added with the bit string 13a is compressed by a predetermined compression method. The Splay tree coding described above is used as the compression method.

The generated compressed-data is divided into a head part of the compressed data and a latter part of the compressed data. When the compressed data is separated, separation is carried out at a position of dividing the compressed bit string 13a. The separated head part is deleted, and only the separated latter part is output to the network or a portable recording medium.

Since the compressed data created by using the Splay tree coding cannot be decompressed from the middle of the compressed data, the "latter part of the compressed data" cannot be decoded. Accordingly, even if the "latter part of the compressed data" is obtained by a malicious third party, the "latter part of the compressed data" cannot be decoded.

When the compressed data is decompressed, the latter part is output in the same manner as in the first embodiment. On the other hand, since the decompression side has not received the data including the bit string 13a from the compression side, the decompression side generates the bit string 13a, and reproduces the head part deleted by the compression side according to the same method as on the compression side.

Specifically, on the decompression side, the same bit string 13a as that generated on the compression side is generated by the same random number generating function as that used at the time of generating the bit string 13a on the compression side. Subsequently, the bit string 13a is compressed by the Splay tree coding used on the compression side at the time of compressing the data string, and the bit string 13a is divided into 23a and 23b shown in FIG. 23 at the same position as the position at which the head part is divided on the compression side.

By adding 23a to the head of the input latter part, the compressed data is reproduced. Subsequently, the reproduced compressed data is decoded by the Splay tree coding used in the compression process, and the original data is extracted from the decoded compressed data and output, thereby restoring the original data.

Thus, in the data compression method and the data decompression method according to the third embodiment, the compression process is performed on the compression process side by adding an optional bit string to the original data, the data is divided into the head part and the latter part, and only the latter part is sent to the decompression process side. On the decompression process side, the compressed data is reproduced by using the received latter part and a bit string created on the decompression side to perform decoding, thereby restoring the original data. Since the information of the original information cannot be obtained from the latter part sent from the compression side to the decompression side, the secrecy can be provided to the compressed data itself.

Therefore, according to the third embodiment, since the head part is not sent from the compression side to the decompression side, both the head part and the latter part are not obtained by a malicious third party. Therefore, data transfer can be performed more safely.

Figure 9:
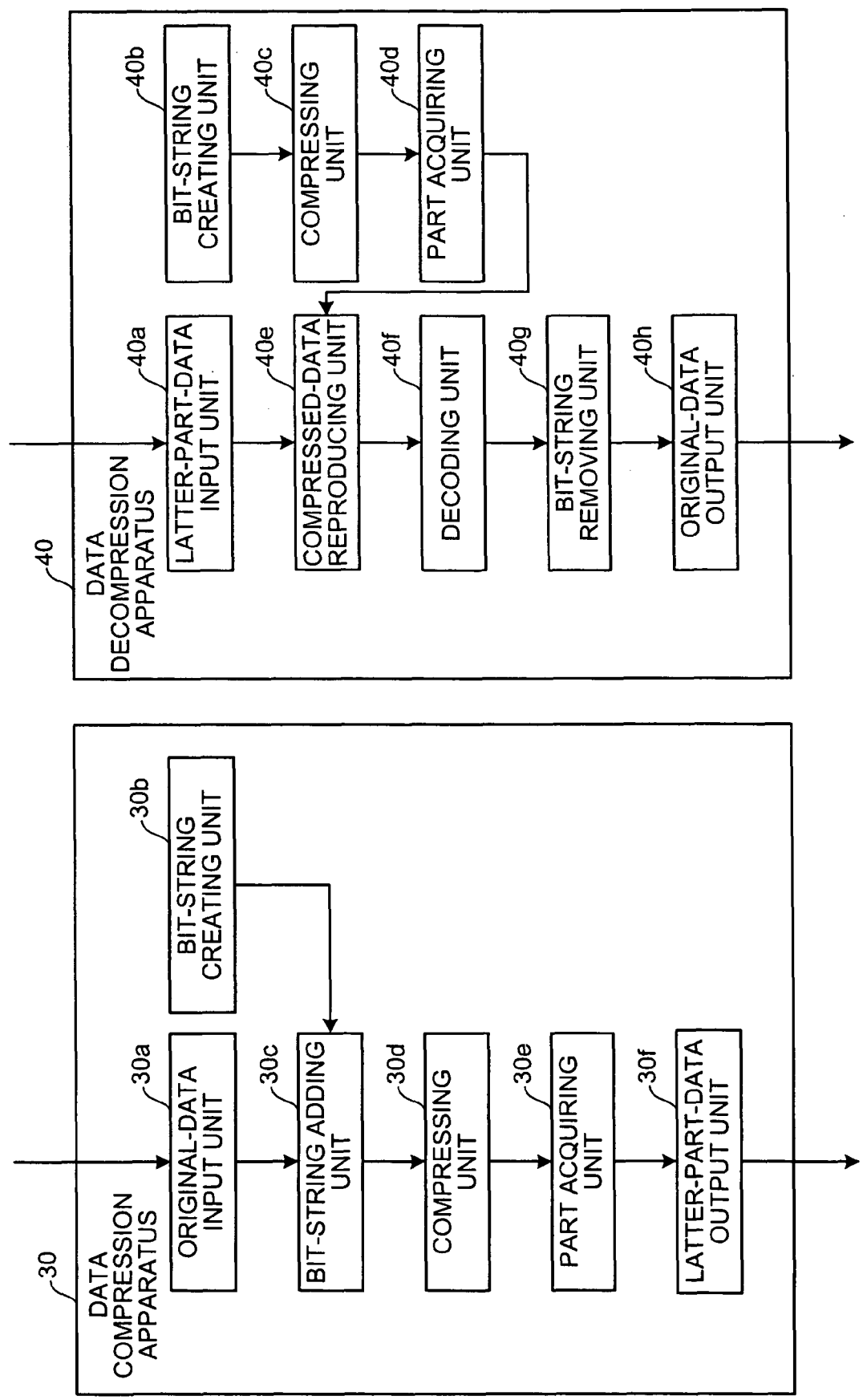
FIG. 9 is a functional block diagram of a configuration of a data compression apparatus and a data decompression apparatus according to the third embodiment.

FIG. 9 is a functional block diagram of a configuration of a data compression apparatus 30 and a data decompression apparatus 40 according to the third embodiment.

The data compression apparatus 30 includes an original-data input unit 30a, a bit-string creating unit 30b, a bit-string adding unit 30c, a compressing unit 30d, a part acquiring unit 30e, and a latter-part-data output unit 30f.

Since the original-data input unit 30a to the part acquiring unit 30e are the same as those in the first embodiment, the explanation thereof is omitted. The latter-part-data output unit 30f deletes the head part sent from the part acquiring unit 30e, and sends the latter part to the decompression side via the communication network or outputs the latter part to a portable recording medium.

Thus, since the latter-part-data output unit 30f outputs only the latter part of the compressed data, even if the latter part is obtained by a malicious third party, the original data cannot be extracted by using only the latter part.

The data decompression apparatus 40 includes a latter-part-data input unit 40a, a bit-string creating unit 40b, a compressing unit 40c, a part acquiring unit 40d, a compressed-data reproducing unit 40e, a decoding unit 40f, a bit-string removing unit 40g, and an original-data output unit 40h.

The latter-part-data input unit 40a inputs the latter part output by the data compression apparatus 30. Upon reception of the latter part, the latter-part-data input unit 40a sends the received latter part to the compressed-data reproducing unit 40e.

The bit-string creating unit 40b performs similar processes as that of the bit-string creating unit 30b of the data compression apparatus 30, to create the same bit string as the bit string created by the bit-string creating unit 30b, and sends the created bit string to the compressing unit 40c.

The compressing unit 40c performs similar processes as that of the compressing unit 30d in the data compression apparatus 30, to compress the bit string created by the bit-string creating unit 40b, and sends the compressed bit string to the part acquiring unit 40d.

The part acquiring unit 40d performs similar processes as that of the part acquiring unit 30e in the data compression apparatus 30, to acquire the head part having the same bit length as that of the head part acquired by the part acquiring unit 30e in the data compression apparatus 30, from the compressed bit string received from the compressing unit 40c, and sends the head part to the compressed-data reproducing unit 40e.

The compressed-data reproducing unit 40e reproduces the compressed data from the latter part data received from the latter-part-data input unit 40a and the head data received from the part acquiring unit 40d. Specifically, the compressed-data reproducing unit 40e adds the head data to the head of the latter part data, to reproduce the compressed data.

The process performed by the decoding unit 40f, the bit-string removing unit 40g, and the original-data output unit 40h is the same as the process performed by the decoding unit 20c, the bit-string removing unit 20d, and the original-data output unit 20e explained in the first embodiment, and hence; the explanation thereof is omitted.

Figure 10:
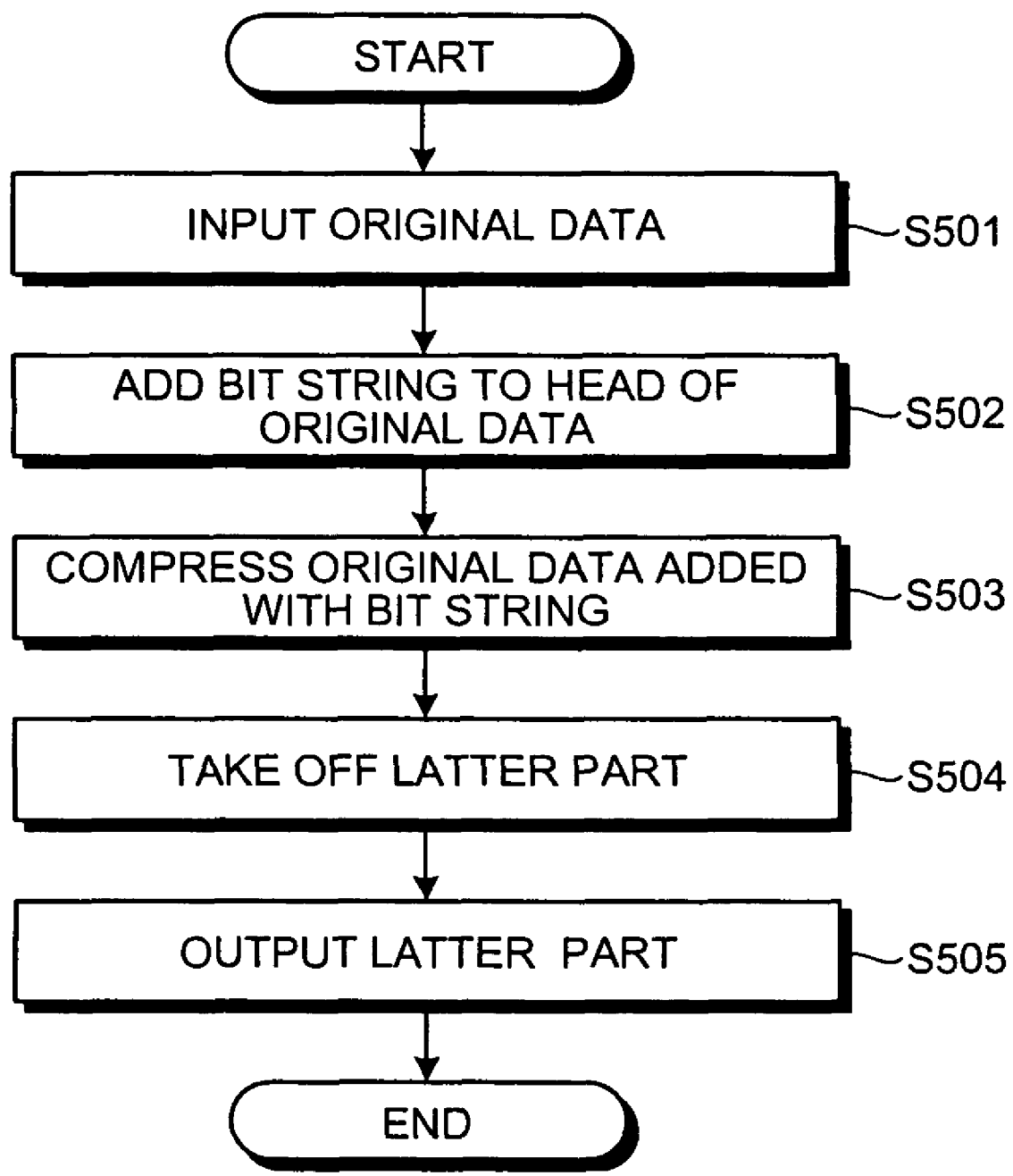
FIG. 10 is a flowchart of a processing procedure for a data compression according to the third embodiment.

FIG. 10 is a flowchart of a processing procedure for the data compression according to the third embodiment. When the original data is input to the original-data input unit 30a in the data compression apparatus 30 (step S501), the bit-string adding unit 30c adds the bit string created by the bit-string creating unit 30b to the head of the original data (step S502).

The compressing unit 30d compresses the original data added with the bit string (step S503), and sends the compressed data to the part acquiring unit 30e. The part acquiring unit 30e separates the compressed data at a predetermined position, and takes off the head part and the latter part (step S504). The latter-part-data output unit 30f having received the head part and the latter part deletes the head part and outputs the latter part (step S505), to finish the process.

Figure 11:
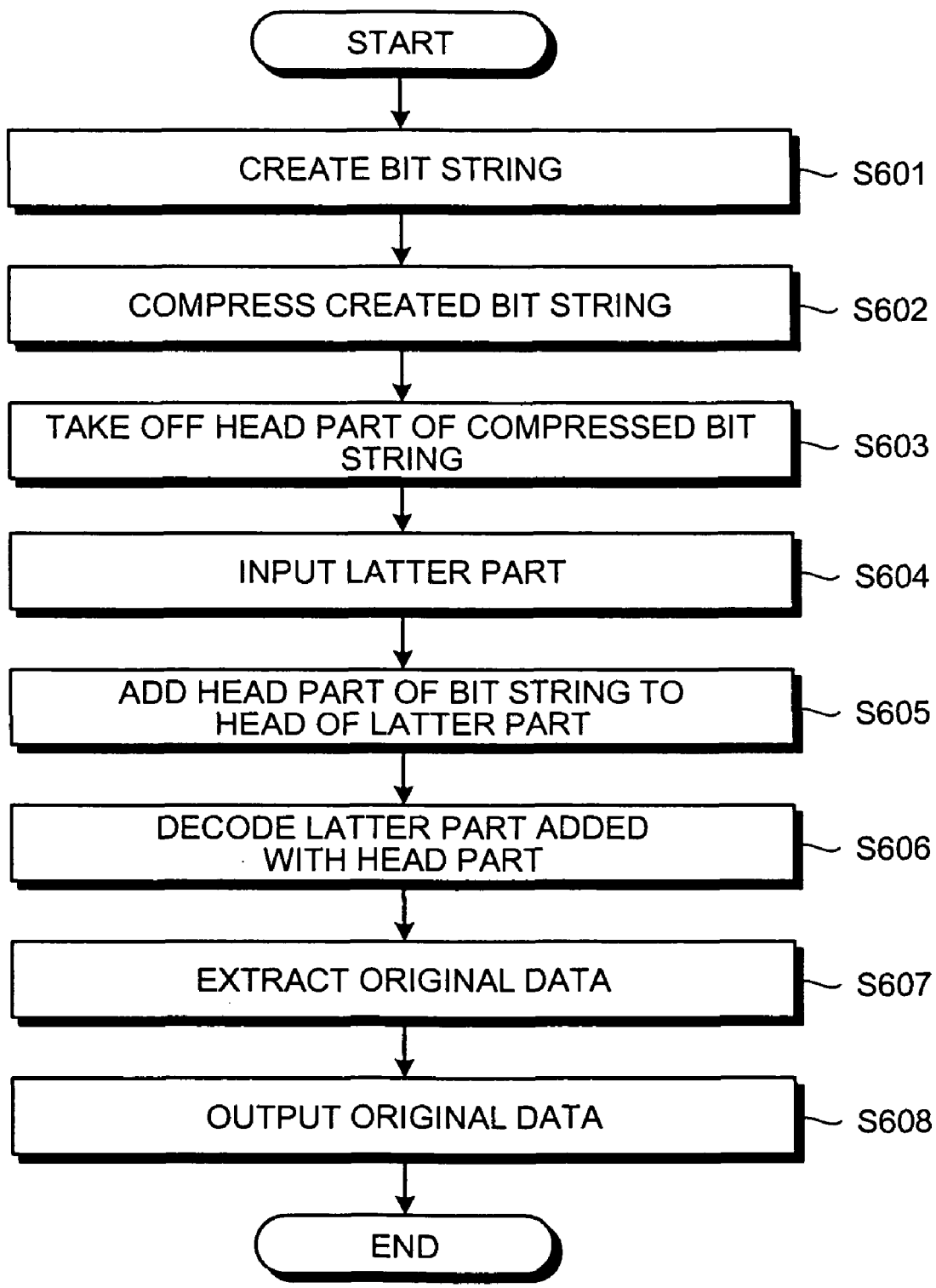
FIG. 11 is a flowchart of a processing procedure for a data decompression according to the third embodiment.

FIG. 11 is a flowchart of a processing procedure for the data decompression according to the third embodiment. The bit-string creating unit 40b in the data decompression apparatus 40 creates an optional bit string (step S601), and sends the created bit string to the compressing unit 40c. The compressing unit 40c compresses the received bit string (step S602), and the part acquiring unit 40d takes off the head part from the compressed bit string (step S603), and sends the taken-off head part to the compressed-data reproducing unit 40e.

Subsequently, the latter-part-data input unit 40a in the data decompression apparatus 40 inputs the head part output from the data compression apparatus 30 (step S604), and sends the head part to the compressed-data reproducing unit 40e. The compressed-data reproducing unit 40e adds the head part received from the part acquiring unit 40d to the head of the latter part received from the latter-part-data input unit 40a, to reproduce the compressed data (step S605).

The decoding unit 40f decodes the compressed data reproduced by the compressed-data reproducing unit 40e (step S606), and the bit-string removing unit 40g extracts the original data from the compressed data reproduced by the decoding unit 40f (step S607). Subsequently, the original-data output unit 20h outputs the original data extracted by the bit-string removing unit 40g to an HDD or an RAM (step S608), to finish the process.

According to the third embodiment, only the latter part of the separated compressed data is sent from the compression side to the decompression side. Therefore, by preventing all the separated compressed data from being obtained by a malicious third party, data transfer can be performed safely.

Furthermore, according to the third embodiment, a common bit string is created by using the same random number generating function on the compression side and the decompression side. However, there are several variations for the method of creating the bit string. Examples of the data compression method and the data decompression method using the variations for creating the bit string are explained with reference to FIGS. 12 to 14.

Figure 12:
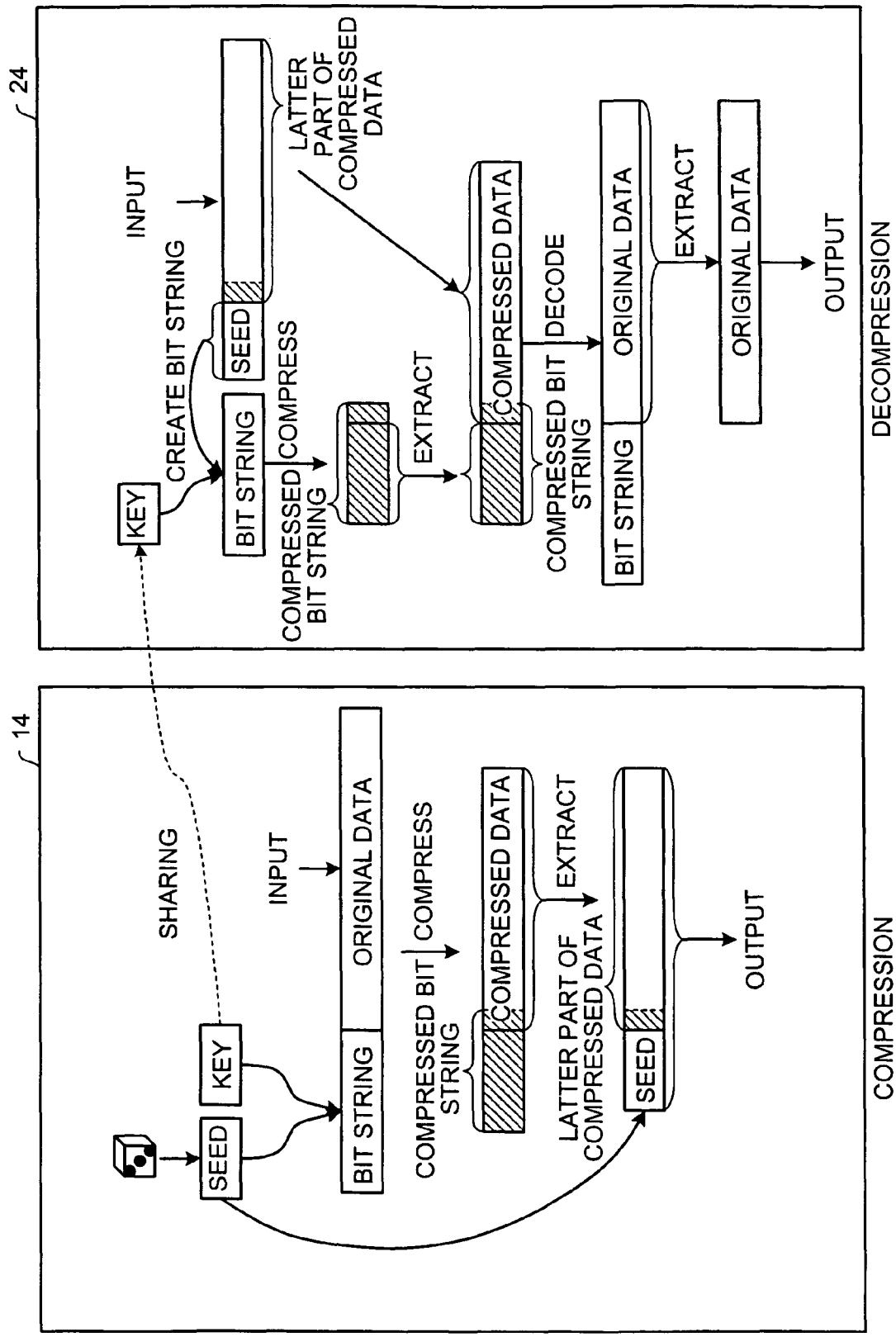
FIG. 12 is a schematic for illustrating an outline of a data compression method and a data decompression method according to a first modification of the third embodiment.

FIG. 12 is a schematic for illustrating an outline of a data compression method and a data decompression method according to a first modification of the third embodiment.

In the data compression method according to the first modification of the third embodiment, a bit string to be added to the head of the original data is created by a seed and a key. In this case, a bit string is created from the seed and the key by using a hash function (one-way function). The original data added with such a bit string is compressed, and the compressed data is divided into the head part and the latter part and taken off. The divided head part is deleted, and the seed used for creating the bit string is added to the head of the latter part and the latter part is output.

When the compressed data is to be decompressed, the latter part is input as in 23 in FIG. 8. The latter part is a data string added with the seed at the head. Since the data including the bit string has not been received from the compression side, the decompression side creates the bit string, to reproduce the head part deleted on the compression side.

At the time of creating the bit string, in the data decompression method according to the modified example 1, the bit string is created in the same manner as on the compression side, from a key shared with the compression side (the same key), and the seed added to the head of the latter part. The subsequent process is the same as the process in 23 shown in FIG. 8, and hence, the explanation thereof is omitted.

Figure 13:
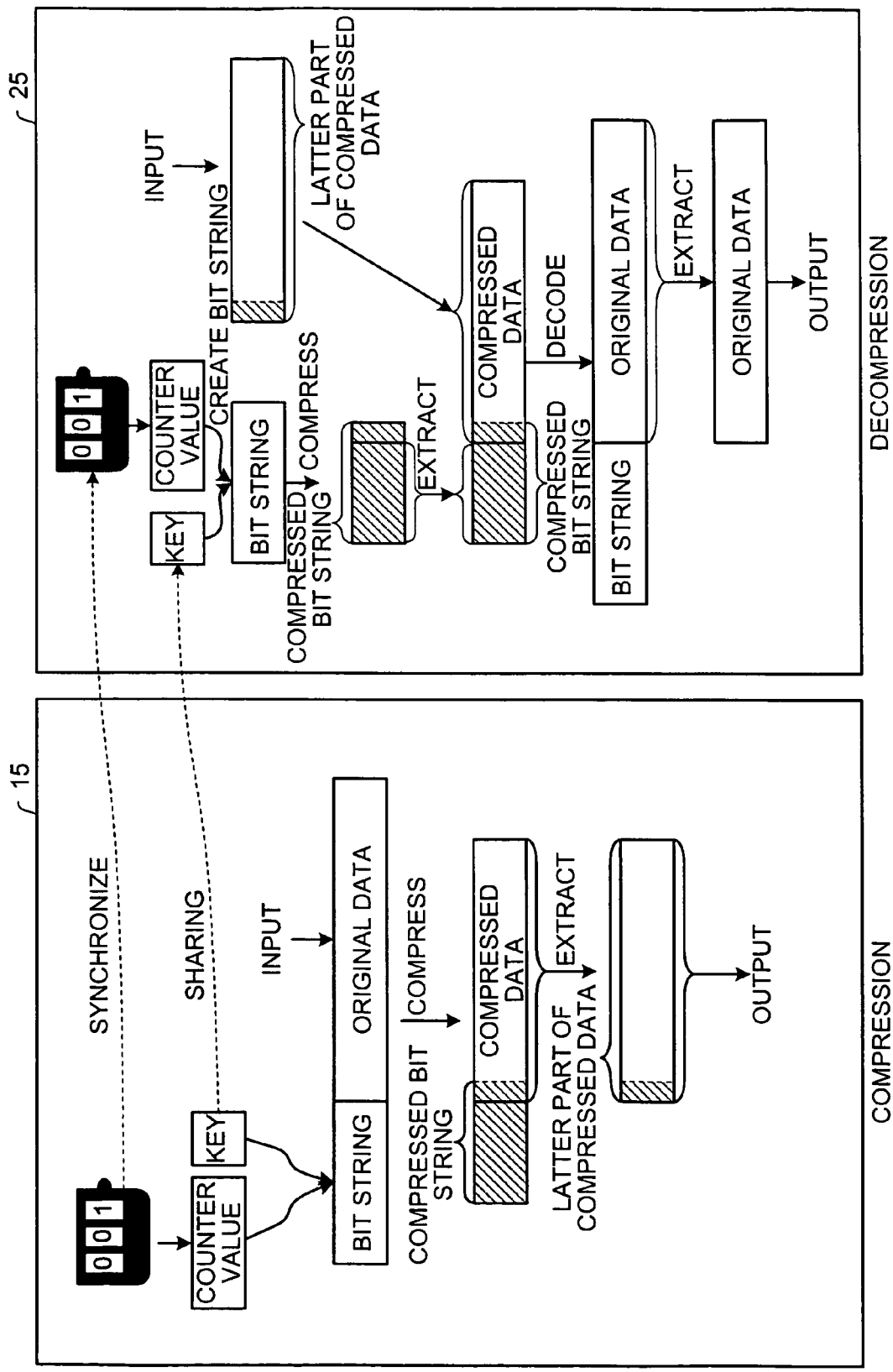
FIG. 13 is a schematic for illustrating an outline of a data compression method and a data decompression method according to a second modification of the third embodiment.

FIG. 13 is a schematic for illustrating an outline of a data compression method and a data decompression method according to a second modification of the third embodiment.

In the data compression method according to the second modification of the third embodiment, a bit string to be added to the head of the original data is created from a counter value and a key. In this case, as a counter for creating such a counter value, the same counter is used on the compression side and the decompression side, and the counter value changes according to a predetermined rule. A bit string is created from the thus created counter value and the key by using a hash function (one-way function).

The original data added with such a bit string is compressed, and the compressed data is divided into the head part and the latter part and taken off. The divided head part is deleted, and only the latter part is output.

When the compressed data is to be decompressed, the latter part is input as in 23 shown in FIG. 8. Since the data including the bit string has not been received from the compression side, the decompression side creates the bit string, to reproduce the head part deleted on the compression side.

At the time of creating the bit string, in the data decompression method according to the modified example 2, the bit string is created in the same manner as on the compression side, from a key shared with the compression side (the same key), and a counter value created by a counter (that generates a counter value according to the same rule as on the compression side), synchronizing with the compression side. The subsequent process is the same as the process in 23 shown in FIG. 8, and hence, the explanation thereof is omitted.

Figure 14:
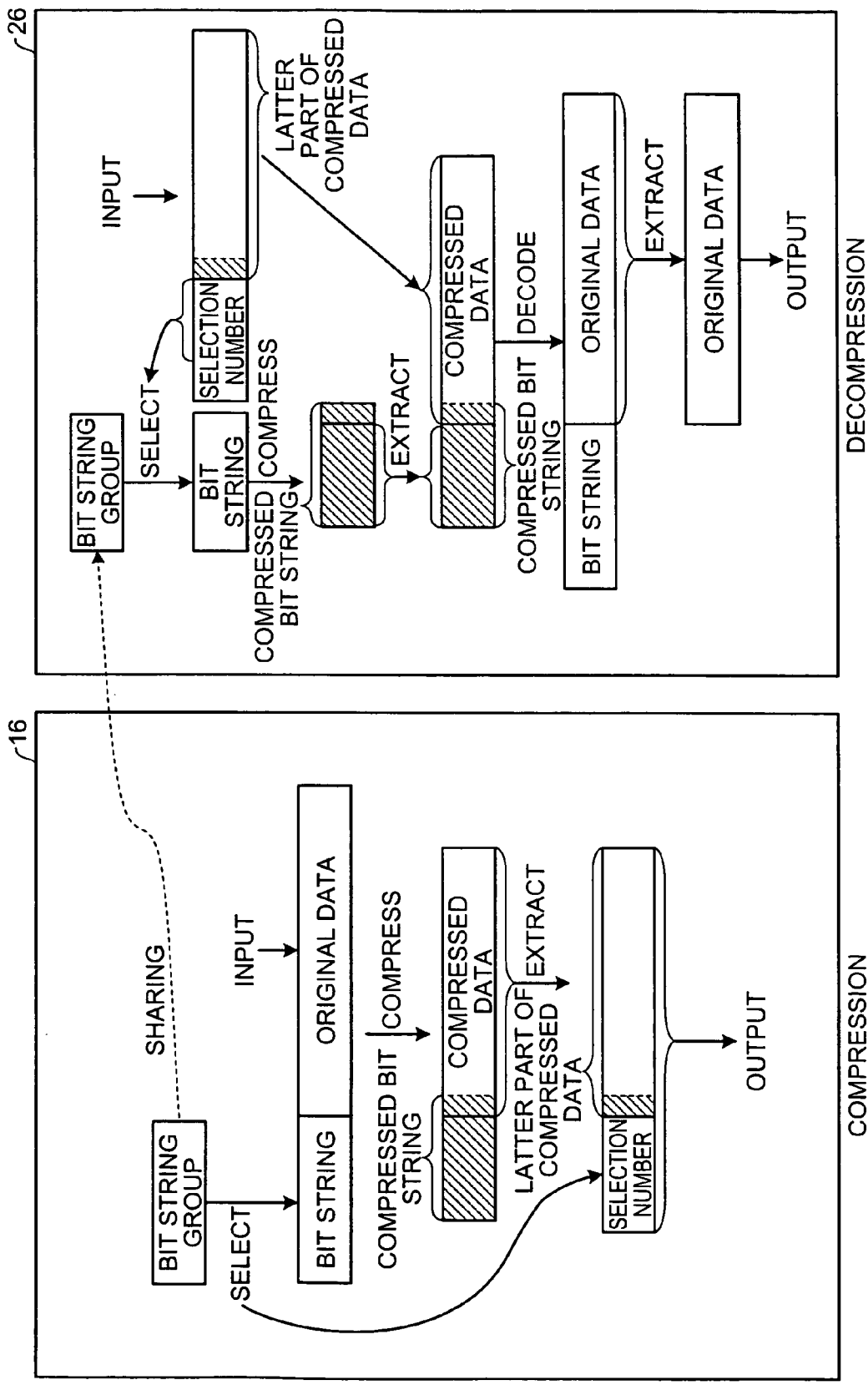
FIG. 14 is a schematic for illustrating an outline of a data compression method and a data decompression method according to a third modification of the third embodiment.

FIG. 14 is a schematic for illustrating an outline of a data compression method and a data decompression method according to a third modification of the third embodiment.

In the data compression method according to the third modification of the third embodiment, a bit string to be added to the head of the original data is selected from a bit string group. In this case, a selection number for specifying the selected bit string is temporarily stored.

The original data added with such a bit string is compressed, and the compressed data is divided into the head part and the latter part and taken off. The divided head part is deleted, and the selection number temporarily stored at the time of creating the bit string is added to the head of the latter part, and the latter part is output.

According to the third modification of the third embodiment, a case that the selection number is used as recognition information for specifying the bit string selected from the bit string group has been explained. However, the recognition information needs only to be the information capable of identifying the selected bit string, such as an address at which the bit string is stored.

When the compressed data is to be decompressed, the latter part is input as in 23 shown in FIG. 8. The latter part is a data string added with the selection number at the head.

Since the data including the bit string has not been received from the compression side, the decompression side creates the bit string, to reproduce the head part deleted on the compression side. At the time of creating the bit string, in the data decompression method according to the modified example 3, the bit string is created in the same manner as on the compression side, from the bit string group shared with the compression side (the same bit string group), and the selection number added to the head of the latter part and received. The subsequent process is the same as the process in 23 shown in FIG. 8, and hence, the explanation thereof is omitted.

Various types of processes explained in the embodiments can be realized by executing a program prepared in advance by a computer. One example of the computer that executes a data compression program and a data decompression program having the same functions as those of the embodiments is explained below.

FIG. 17 is a schematic of a computer 100 that executes the data compression program and the data decompression program. In FIG. 17, a case that the data compression program and the data decompression program are operated on the same computer is shown. However, only one of the data compression program and the data decompression program can be operated on each computer.

The computer 100 as a data compression/decompression apparatus is constructed by connecting an input unit 101, a monitor 102, a portable medium control I/F 103, a network I/F 104, a hard disk drive (HDD), and a central processing unit (CPU) 106 by a bus 107. The input unit 101 is an input device such as a keyboard, and the monitor 102 is a display device.

The portable medium control I/F 103 controls a portable medium such as a CD-R. The network I/F 104 is a communication device such as a local area network (LAN) board, and communicates with other computers 100 and server devices (not shown).

A data compression program 105a and a data decompression program 105b are stored beforehand in the HDD 105. When the CPU 106 reads and executes the data compression program 105a and the data decompression program 105b in the HDD 105, as shown in FIG. 17, the data compression program 105a and the data decompression program 105b respectively function as a data compression process 106a and a data decompression process 106b.

The data compression program 105a and the data decompression program 105b need not be stored in the HDD beforehand. For example, these programs can be stored in a portable recording medium such as a flexible disk (FD), a CD-ROM, or a magneto-optical disk that can be read by the computer 100, or "other computers (or servers)" connected to the computer 100 via a public line, the Internet, the LAN, or a wide area network (WAN), and the computer 100 can read and execute these programs.

According to the present invention, a bit string of a predetermined length is added to the head of a data string to be compressed, the data string to be compressed added with the bit string is compressed, and the head part from the head position of the created compressed data string to a predetermined position of the compressed bit string is divided from the compressed data string. Accordingly, the secrecy is given to the compressed data itself to increase the security level, thereby realizing both reduction of the data size and data secrecy.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for creating a compressed data and decompressing the compressed data, the method for creating the compressed data comprising:
adding a first bit string having a predetermined length to a head of the data string to produce a bit and data string;
first compressing the bit and data string by using a compression method to produce a compressed bit and data string comprising a compressed first bit string and a compressed data string;
dividing the compressed bit and data string into a first part that is from a head position to a predetermined position of the compressed first bit string in the compressed bit and data string and a second part that is a remaining of the compressed bit and data string; and
outputting the second part, and
the method for decompressing the compressed data comprising:
second compressing, using a processor, a second bit string that is the same as the first bit string by using the compression method used in the first compressing to produce a compressed second bit string, the compressed second bit string being the same as the compressed first bit string;
taking off, using the processor, a head part from the compressed second bit string, the head part being the same as the first part;
inputting the second part output at the outputting;
reproducing the compressed bit and data string by adding the head part to a head of the second part input at the inputting;
decoding the compressed bit and data string reproduced at the reproducing; and
outputting the data string by removing a decoded bit string from the decoded bit and data string.

2. A method for creating a compressed data and decompressing the compressed data, the method for creating the compressed data comprising:
creating a key;
creating an optional seed;
creating a first bit string from the key and the seed by using a hash function;
adding the first bit string to a head of the data string to produce a bit and data string;
first compressing the bit and data string by using a compression method to produce a compressed bit and data string comprising a compressed first bit string and a compressed data string;
dividing the compressed bit and data string into a first part that is from a head position to a predetermined position of the compressed first bit string in the compressed bit and data string and a second part that is a remaining of the compressed bit and data string;
adding the seed to the second part; and
outputting the second part to which the seed is added,
the method for decompressing the compressed data comprising:
input the second part output at the outputting;
separating the seed from the second part input at the inputting;
creating a second bit string from the key and the seed separated from the second part, by using the hash function, the second bit string being the same as the first bit string;
second compressing, using a processor, the second bit string by using the compression method used in the first compressing to produce a compressed second bit string, the compressed second bit string being the same as the compressed first bit string;
taking off, using the processor, a head part from the compressed second bit string, the head part being the same as the first part;
reproducing the compressed bit and data string by adding the head part to a head of the second part from which the seed is separated at the separating;
decoding the compressed bit and data string reproduced at the reproducing; and
outputting the data string by removing a decoded bit string from the decoded bit and data string.

3. A method for creating a compressed data and decompressing the compressed data, the method for creating the compressed data comprising:
creating a key;
creating different counter values based on a predetermined rule;
creating a first bit string from the key and the counter value by using a hash function;
adding the first bit string to a head of the data string to produce a bit and data string;
first compressing the bit and data string by using a compression method to produce a compressed bit and data string comprising a compressed first bit string and a compressed data string;
dividing the compressed bit and data string into a first part that is from a head position to a predetermined position of the compressed first bit string in the compressed bit and data string and a second part that is a remaining of the compressed bit and data string; and
outputting the second part, and the method for decompressing the compressed data comprising:

creating different counter values based on the same rule as the predetermined rule, every time the counter value is created;

creating a second bit string from the key and the counter value created at the counter value by using the hash function;

second compressing, using a processor, the second bit string that is the same as the first bit string by using the compression method used in the first compressing to produce a compressed second bit string, the compressed second bit string being the same as the compressed first bit string;

taking off, using the processor, a head part from the compressed second bit string, the head part being the same as the first part;

inputting the second part output at the outputting;

reproducing the compressed bit and data string by adding the head part to a head of the second part input at the inputting;

decoding the compressed bit and data string reproduced at the reproducing; and outputting the data string by removing a decoded bit string from the decoded bit and data string.

4. A method for creating a compressed data and decompressing the compressed data, the method for creating the compressed data comprising:

selecting a first bit string having a predetermined length from a bit string group stored in a storing unit;

adding the first bit string to a head of the data string to produce a bit and data string;

first compressing the bit and data string by using a compression method to produce a compressed bit and data string comprising a compressed first bit string and a compressed data string;

dividing the compressed bit and data string into a first part that is from a head position to a predetermined position of the compressed first bit string in the compressed bit and data string and a second part that is a remaining of the compressed bit and data string;

adding information on the first bit string to the second part; and outputting the second part to which the information on the selected bit string is added, and the method for decompressing the compressed data comprising:

inputting the second part output at the outputting;

separating the information on the selected bit string from the second part input at the inputting;

selecting a second bit string that is same as the first bit string from the bit string group stored in the storing unit by using the separated information;

second compressing, using a processor, the second bit string by using the compression method used in the first compressing to produce a compressed second bit string, the compressed second bit string being the same as the compressed first bit string;

taking off, using the processor, a head part from the compressed second bit string, the head part being the same as the first part;

reproducing the compressed bit and data string by adding the head part to a head of the second part from which the information is separated at the separating;

decoding the compressed bit and data string reproduced at the reproducing; and outputting the data string by removing a decoded bit string from the decoded bit and data string.

5. A non-transitory computer-readable recording medium that stores a computer program for creating a compressed data and decompressing the compressed data, wherein the computer program causes a computer to execute a process for creating the compressed data comprising:

adding a first bit string having a predetermined length to a head of the data string to produce a bit and data string;

first compressing the bit and data string to produce a compressed bit and data string comprising a compressed first bit string and a compressed data string;

dividing the compressed bit and data string into a first part that is from a head position to a predetermined position of the compressed first bit string in the compressed bit and data string and a second part that is a remaining of the compressed bit and data string; and outputting the second part, and the computer program causes the computer to execute a process for decompressing the compressed data comprising:

second compressing a second bit string that is the same as the first bit string by using the same compression method used in the first compressing to produce a compressed second bit string, the compressed second bit string being the same as the compressed first bit string;

taking off a head part from the compressed second bit string, the head part being the same as the first part;

inputting the second part output at the outputting;

reproducing the compressed bit and data string by adding the head part to a head of the second part input at the inputting;

decoding the compressed bit and data string reproduced at the reproducing; and outputting the data string by removing a decoded bit string from the decoded bit and data string.

6. A non-transitory computer-readable recording medium that stores a computer program for creating a compressed data and decompressing the compressed data, wherein the computer program causes a computer to execute a process for creating the compressed data comprising:

creating a key;

creating an optional seed;

creating a first bit string from the key and the seed by using a hash function;

adding the first bit string to a head of the data string to produce a bit and data string;

first compressing the bit and data string by using a compression method to produce a compressed bit and data string comprising a compressed first bit string and a compressed data string; and dividing the compressed bit and data string into a first part that is from a head position to a predetermined position of the compressed first bit string in the compressed bit and data string and a second part that is a remaining of the compressed bit and data string, and the computer program causes the computer to execute a process for decompressing the compressed data comprising:

input the second part output at the outputting;

separating the seed from the second part input at the inputting;

creating a second bit string from the key and the seed separated from the second part, by using the hash function, the second bit string being the same as the first bit string;

second compressing the second bit string by using the compression method used in the first compressing to produce a compressed second bit string, the compressed second bit string being the same as the compressed first bit string;

taking off a head part from the compressed second bit string, the head part being the same as the first part;

reproducing the compressed bit and data string by adding the head part to a head of the second part from which the seed is separated at the separating;

decoding the compressed bit and data string reproduced at the reproducing; and outputting the data string by removing a decoded bit string from the decoded bit and data string.

7. A non-transitory computer-readable recording medium that stores a computer program for creating a compressed data and decompressing the compressed data, wherein the computer program causes a computer to execute a process for creating the compressed data comprising:

creating a key;

creating different counter values based on a predetermined rule;

creating a first bit string from the key and the counter value by using a hash function;

adding the first bit string to a head of the data string to produce a bit and data string;

first compressing the bit and data string by using a compression method to produce a compressed bit and data string comprising a compressed first bit string and a compressed data string;

dividing the compressed bit and data string into a first part that is from a head position to a predetermined position of the compressed first bit string in the compressed bit and data string and a second part that is a remaining of the compressed bit and data string; and outputting the second part, and the computer program causes the computer to execute a process for decompressing the compressed data comprising:

creating different counter values based on the same rule as the predetermined rule, every time the counter value is created;

creating a second bit string from the key and the counter value created at the counter value by using the hash function;

second compressing the second bit string that is the same as the first bit string by using the compression method used in the first compressing to produce a compressed second bit string, the compressed second bit string being the same as the compressed first bit string;

taking off a head part from the compressed second bit string, the head part being the same as the first part;

inputting the second part output at the outputting;

reproducing the compressed bit and data string by adding the head part to a head of the second part input at the inputting;

decoding the compressed bit and data string reproduced at the reproducing; and outputting the data string by removing a decoded bit string from the decoded bit and data string.

8. A non-transitory computer-readable recording medium that stores a computer program for creating a compressed data and decompressing the compressed data, wherein the computer program causes a computer to execute a process for creating the compressed data comprising:

selecting a first bit string having a predetermined length from a bit string group stored in a storing unit;

adding the first bit string to a head of the data string to produce a bit and data string;

first compressing the bit and data string by using a compression method to produce a compressed bit and data string comprising a compressed first bit string and a compressed data string;

dividing the compressed bit and data string into a first part that is from a head position to a predetermined position of the compressed first bit string in the compressed bit and data string and a second part that is a remaining of the compressed bit and data string;

adding information on the first bit string to the second part; and outputting the second part to which the information on the selected bit string is added, and the computer program causes the computer to execute a process for decompressing the compressed data comprising:

inputting the second part output at the outputting;

separating the information on the first bit string from the second part input at the inputting;

selecting a second bit string that is the same as the first bit string from the bit string group stored in the storing unit by using the separated information;

second compressing the second bit string by using the compression method used in the first compressing to produce a compressed second bit string, the compressed second bit string being the same as the compressed first bit string;

taking off a head part from the compressed second bit string, the head part being the same as the first part;

reproducing the compressed bit and data string by adding the head part to a head of the second part from which the information is separated at the separating;

decoding the compressed bit and data string reproduced at the reproducing; and outputting the data string by removing a decoded bit string from the decoded bit and data string.

* * * * *